(12) United States Patent  
Motoyama

(10) Patent No.: US 8,582,181 B2
(45) Date of Patent: Nov. 12, 2013

(54) OPTICAL READING DEVICE, CONTROL METHOD FOR AN OPTICAL READING DEVICE, AND PROGRAM

(75) Inventor: Hiroyuki Motoyama, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 315 days.

(21) Appl. No.: 13/008,638

(22) Filed: Jan. 18, 2011

(65) Prior Publication Data

US 2011/0181918 A1 Jul. 28, 2011

(30) Foreign Application Priority Data

Jan. 28, 2010 (JP) ................................ 2010-016393

(51) Int. Cl.
*H04N 1/00* (2006.01)
*H04N 1/04* (2006.01)

(52) U.S. Cl.
USPC .......................................... 358/404; 358/498

(58) Field of Classification Search
USPC ......... 358/474, 475, 471, 444, 498, 404, 1.16
See application file for complete search history.

(56) References Cited

U.S. PATENT DOCUMENTS

| 5,239,387 | A | * | 8/1993 | Stein et al. ..................... 358/444 |
| 5,341,225 | A | * | 8/1994 | Stein et al. ..................... 358/498 |
| 5,724,490 | A |   | 3/1998 | Shibaki et al. |
| 6,972,876 | B2 | * | 12/2005 | Yokochi ........................ 358/471 |
| 8,253,988 | B2 | * | 8/2012 | Inukai ............................ 358/474 |
| 2002/0027163 | A1 | * | 3/2002 | Haba .............................. 235/454 |
| 2006/0268355 | A1 | * | 11/2006 | Chen et al. ................. 358/426.03 |
| 2007/0016727 | A1 | * | 1/2007 | Peters et al. ................... 711/114 |
| 2009/0066988 | A1 | * | 3/2009 | Imaizumi ..................... 358/1.13 |
| 2009/0232571 | A1 | * | 9/2009 | Narusawa ....................... 400/76 |
| 2009/0316233 | A1 | * | 12/2009 | Inukai ............................ 358/498 |
| 2010/0315690 | A1 | * | 12/2010 | Kubozono et al. ............ 358/475 |

FOREIGN PATENT DOCUMENTS

| JP | 06-098102 | 4/1994 |
| JP | 2004-304245 | 10/2004 |
| JP | 2009-124241 | 6/2009 |
| JP | 2009-284191 | 12/2009 |
| JP | 2011155550 | * 8/2011 |

* cited by examiner

Primary Examiner — Jerome Grant, II

(57) ABSTRACT

Restart shifting in the scanned image data is minimized and the resulting image quality is improved even when scanning pauses and resumes. A dot impact printer 10 issues a command to stop media conveyance when available capacity in the image buffer 41A goes below a stop buffering level, and continues scanning by the scanner 111, 112 until a conveyance stop delay period passes and then stops scanning. When the available capacity exceeds a resume buffering level after the conveyance stop delay period has passed, the dot impact printer 10 applies a command to resume media transportation and scanning, prohibits storing the scanned image data from the scanners 111, 112 until a resume drive delay time passes, and resumes storing data after the resume drive delay time passes.

7 Claims, 14 Drawing Sheets

OPTICAL READING DEVICE, CONTROL METHOD FOR AN OPTICAL READING DEVICE, AND PROGRAM

CROSS-REFERENCE TO RELATED APPLICATION

Japanese Patent Application No. 2010-016393 filed on Jan. 28, 2010, is hereby incorporated by reference in its entirety.

BACKGROUND

1. Technical Field

The present invention relates to an optical reading device that conveys and optically reads a medium, to a method of controlling the optical reading device, and to a program.

2. Related Art

Optical reading devices such as scanners that are connected to a host computer convey a document (medium), temporarily store the image data captured from the conveyed medium in a buffer (a storage unit), and after scanning the document is completed, send the scanned data stored in the buffer to the host computer. See, for example, Japanese Unexamined Patent Appl. Pub. JP-A-2009-284191.

However, when the scanned data cannot be sent because of a problem on the host computer side (such as when the image processing capacity of the host computer cannot keep up), the scanned data is particularly large, or the scanning speed of the scanner is faster than the data transmission speed to the host computer, the buffer may become full. As a result, the scanner must pause scanning and conveying the document (or moving the scanner). In addition, depending upon how the buffer is used, buffer capacity may be insufficient or buffered data may be overwritten with newly scanned data even though the buffer is used to full capacity, and some scanned data may be lost.

Before or when the buffer capacity is exhausted in the related art, scanning is paused and a standby mode is entered. When sending the scanned data from the buffer to the host computer resumes or when a sufficient amount of data is transmitted so that there is sufficient buffer capacity again, scanning then resumes to acquire data for the remaining portion of the document.

A problem with this configuration, however, is that scanning accuracy may drop as a result of how precisely conveying the document can be stopped and restarted when scanning is paused and then resumed. This problem is not limited to when scanning is paused, and also occurs at the beginning and end of normal document scanning.

More specifically, image shifting occurs near where scanning was paused when scanning resumes. This image shift is further described below. Due to inertia, gear backlash, or roller deformation, for example, there is a delay between when driving the paper feed motor, for example, starts and when the rollers that convey the actual document start working, creating a period in which the document is not actually conveyed, and resulting in scanned data being captured from the same position where the document is not conveyed even though scanning is synchronized to the transportation motor. When the transportation motor, for example, is stopped, the rollers that convey the actual document cannot respond immediately for the same reasons, resulting in the document continuing to be actually conveyed, and if scanning continues during this time, the scanned data can be captured as normal scanning data.

SUMMARY

An optical reading device, a control method for an optical reading device, and a program according to the invention can minimize the effect of image shifting such as when resuming scanning at the beginning and end of scanning, and can improve the quality of the image in the captured scanning data, even when scanning is paused and then restarted due to insufficient buffer capacity.

A first aspect of the invention is an optical reading device including: a transportation unit that can convey a medium through a transportation path; an optical reading unit that is disposed to the transportation path, optically reads the medium conveyed by the transportation unit, and outputs the scanned data; a storage unit that stores the scanned data output by the optical reading unit; and a control unit that controls the storage unit, transportation unit, and optical reading unit, applies a stop command to stop driving the transportation unit, and until a specified time passes from the stop command, continues scanning by the optical reading unit and storing the scanned data to the storage unit.

When the paper feed motor of the transportation unit is stopped but the rollers that actually convey the document cannot respond immediately due to such factors as inertia, gear backlash, and roller deformation, and the document therefore continues to be actually conveyed, this aspect of the invention can continue scanning by the optical reading unit and can store the captured image data as normal image data in the storage unit, and can therefore improve image quality.

In an optical reading device according to another aspect of the invention, the control unit applies a start command to start driving the transportation unit, and discards the scanned data captured by the optical reading unit, or prohibits storing the scanned data in the storage unit, until a specified time passes from the start command.

When the paper feed motor of the transportation unit is stopped and then driven, the rollers that actually convey the document cannot respond immediately due to such factors as inertia, gear backlash, and roller deformation, and there is a delay until the document is actually conveyed. During this delay, this aspect of the invention can avoid scanning the same data twice from the same position where the medium is not conveyed even when scanning by the optical reading unit is synchronized with the transportation motor, and can therefore improve image quality.

In an optical reading device according to another aspect of the invention, the amount of data captured by the optical reading unit and stored in the storage unit when the control unit continues scanning by the optical reading unit until a specified time passes from the stop command, and the amount of data captured and discarded when the control unit continues scanning by the optical reading unit until a specified time passes from the start command, are the same.

Tests demonstrated that the theoretical transportation distance that the document is not actually conveyed when the paper feed motor of the transportation unit is stopped and then driven because the rollers that actually convey the document cannot respond immediately due to such factors as inertia, gear backlash, and roller deformation, and the transportation distance that the document continues to be actually conveyed when the transportation motor is stopped, are substantially the same. Because the amount that the medium is theoretically conveyed (the amount the media transportation motor is driven) and the amount actually conveyed can be made the same, the optical reading unit in this aspect of the invention can acquire scanned image data from the desired scanning area, including from the leading end to the trailing end of the medium, and can improve image quality.

In an optical reading device according to another aspect of the invention, the control unit applies the stop command to the transportation unit when available capacity (remaining capacity) in the storage unit goes below a specified level, and applies the start command to the transportation unit when the available capacity exceeds a specified level.

This aspect of the invention applies a command to the transportation unit to stop media transportation when the available capacity in the storage unit goes below a specified level; continues scanning by means of the optical reading unit until a specified time passes from the stop command, and then stops scanning by the optical reading unit; applies a command to start driving to the transportation unit and optical reading unit when the available capacity exceeds a specified level after a specified time passes; prohibits storing the scanned image data from the optical reading unit in the storage unit until a specified time passes from the start command; and after the specified time passes, stores the scanned data output from the optical reading unit in the storage unit. As a result, a scanning shift caused by an offset between the scanning position when media transportation stops and the scanning position when media transportation starts can be suppressed, and the quality of the image corresponding to the captured scanning data (image data) can be improved.

In another aspect of the invention, the control unit discards the scanned data output from the optical reading unit during the resume drive delay period.

This aspect of the invention discards the scanned data output from the optical reading device during the resume drive delay period while operation is unstable when driving the optical reading unit resumes. As a result, only correctly scanned data is stored in the storage unit, image shifting when operation resumes can be suppressed, and the quality of the image reconstructed from the scanned data (image data) can be improved.

In an optical reading device according to another aspect of the invention, the transportation unit includes a media transportation motor; and the control unit applies the stop command at a timing when the drive reference timing of the media transportation motor and the scanning reference timing of the optical reading unit are synchronized.

In this aspect of the invention the control unit asserts a stop command when the drive reference timing of the media transportation motor and the scanning reference timing of the optical reading unit are synchronized and match. As a result, the optical reading unit can always scan consistently during the conveyance stop delay period, shifts in the scanned image data can therefore be suppressed, and the quality of the image reconstructed from the captured data (image data) can be improved.

In another aspect of the invention the optical reading unit has a plurality of LEDs as a light source for scanning, and the control unit turns the LEDs off when the optical reading unit stops scanning.

This aspect of the invention suppresses unnecessary power consumption when the optical reading unit is stopped.

Another aspect of the invention is a control method of an optical reading device including steps of: a transportation unit conveying a medium through a transportation path; an optical reading unit optically reading the medium conveyed by the transportation unit and outputting the scanned data; a storage unit storing the scanned data output by the optical reading unit; and a control unit applying a stop command to stop driving the transportation unit, and until a specified time passes from the stop command, continuing scanning by the optical reading unit and storing the scanned data to the storage unit.

When the paper feed motor of the transportation unit is stopped but the rollers that actually convey the document cannot respond immediately due to such factors as inertia, gear backlash, and roller deformation, and the document therefore continues to be actually conveyed, the control method according to this aspect of the invention can continue scanning by the optical reading unit and can store the captured image data as normal image data in the storage unit, and can therefore improve image quality.

In a control method according to another aspect of the invention, the control unit further includes steps of: applying a start command to start driving the transportation unit, and discarding the scanned data captured by the optical reading unit, or prohibiting storing the scanned data in the storage unit, until a specified time passes from the start command.

When the paper feed motor of the transportation unit is stopped and then driven, the rollers that actually convey the document cannot respond immediately due to such factors as inertia, gear backlash, and roller deformation, and there is a delay until the document is actually conveyed. During this delay, the method according to this aspect of the invention can avoid scanning the same data twice from the same position where the medium is not conveyed even when scanning by the optical reading unit is synchronized with the transportation motor, and can therefore improve image quality.

The control method according to another aspect of the invention also has steps of the control unit applying the stop command to the transportation unit when available capacity in the storage unit goes below a specified stop buffering level; and the control unit applying the start command to the transportation unit when the available capacity exceeds a specified level.

This aspect of the invention applies a command to the transportation unit to stop media transportation when the available capacity in the storage unit goes below a specified level; continues scanning by means of the optical reading unit until a conveyance stop delay period passes from the stop command, and then stops scanning by the optical reading unit; applies a command to resume driving to the transportation unit and optical reading unit when the available capacity exceeds a specified level after the conveyance stop delay period passes; prohibits storing the scanned image data from the optical reading unit in the storage unit until a resume drive delay time passes from the resume command; and after the resume drive delay time passes, resumes storing the scanned data output from the optical reading unit in the storage unit. As a result, a shift between the scanning position when media transportation stops and the scanning position when media transportation resumes can be suppressed, and the quality of the image corresponding to the captured scanning data (image data) can be improved.

Another aspect of the invention is a program that can be executed by a control unit that controls an optical reading device that has a transportation unit that can convey a medium through a transportation path, an optical reading unit that is disposed to the transportation path, optically reads the medium conveyed by the transportation unit, and outputs the scanned data, and a storage unit that stores the scanned data output by the optical reading unit, the program causing the control unit to apply a stop command to stop driving the transportation unit, and until a specified time passes from the stop command, continue scanning by the optical reading unit and storing the scanned data to the storage unit. The program can be recorded on and distributed as data storage medium such as a hard disc, an Optical Disc (CD and DVD, for example), a magneto-optical disc, or a semiconductor memory.

This aspect of the invention causes the control unit to apply a command to the transportation unit to stop media transportation when the available capacity in the storage unit goes below a specified level; continue scanning by means of the optical reading unit until a conveyance stop delay period passes from the stop command, and then stop scanning by the optical reading unit; apply a command to resume driving to the transportation unit and optical reading unit when the available capacity exceeds a specified level after the conveyance stop delay period passes; prohibit storing the scanned image data from the optical reading unit in the storage unit until a resume drive delay time passes from the resume command; and after the resume drive delay time passes, resume storing the scanned data output from the optical reading unit in the storage unit. As a result, a shift between the scanning position when media transportation stops and the scanning position when media transportation resumes can be suppressed, and the quality of the image corresponding to the captured scanning data (image data) can be improved.

EFFECT OF THE INVENTION

The invention can suppress image shifting between the scanning position when media transportation stops and the scanning position when media transportation resumes due to pausing and resuming media transportation and scanning, and can improve the quality of the image reconstructed from the captured scanning data (image data).

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
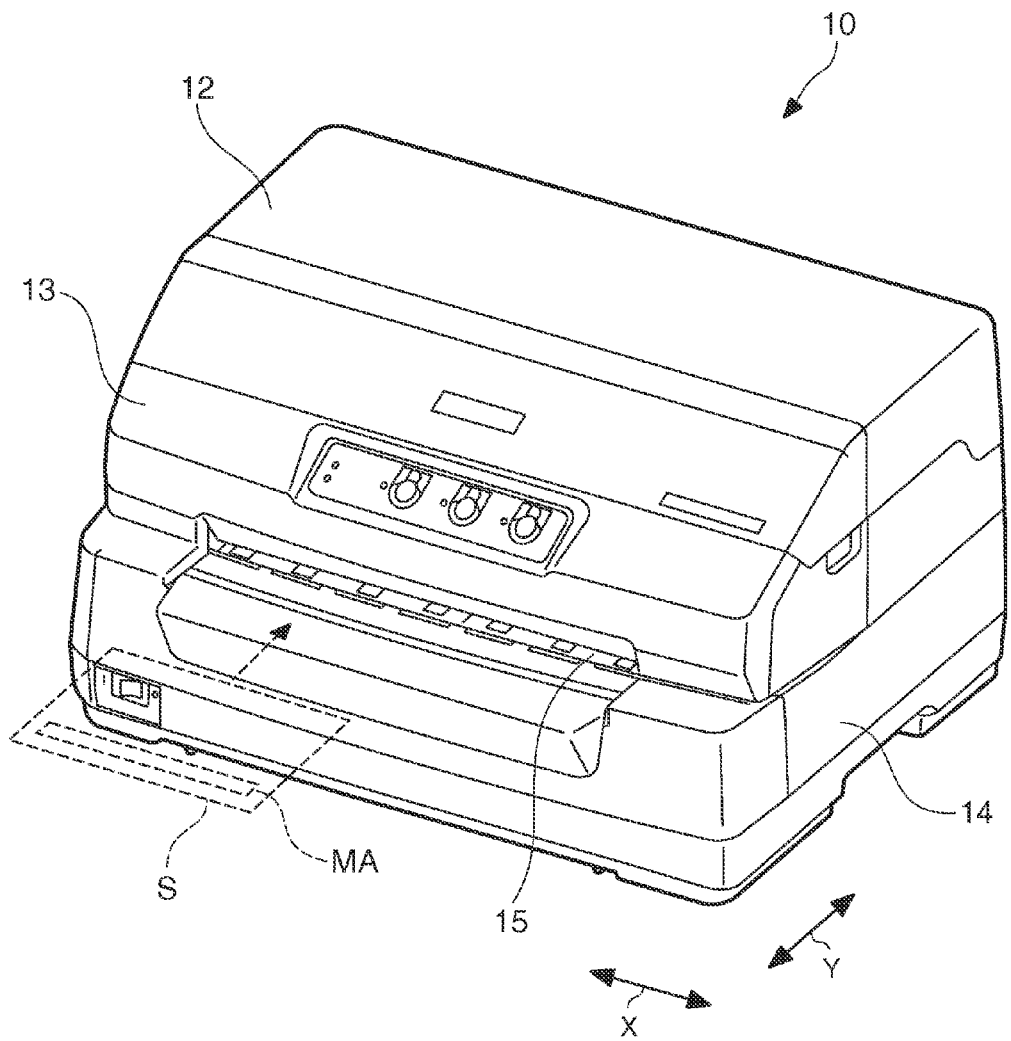
FIG. 1 is an external oblique view of a dot impact printer according to a preferred embodiment of the invention.
Figure 2:
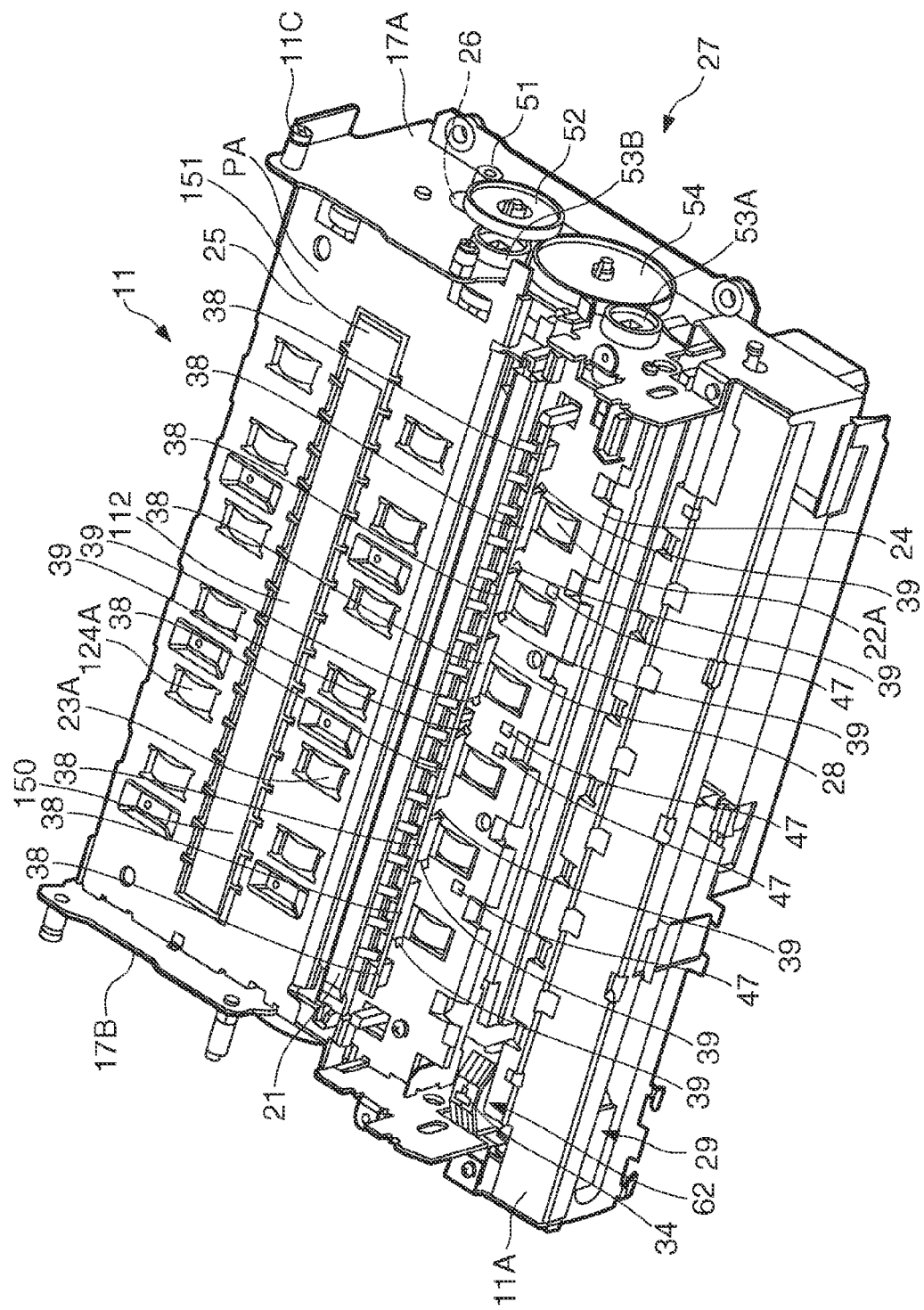
FIG. 2 is an oblique view of the print assembly.
Figure 3:
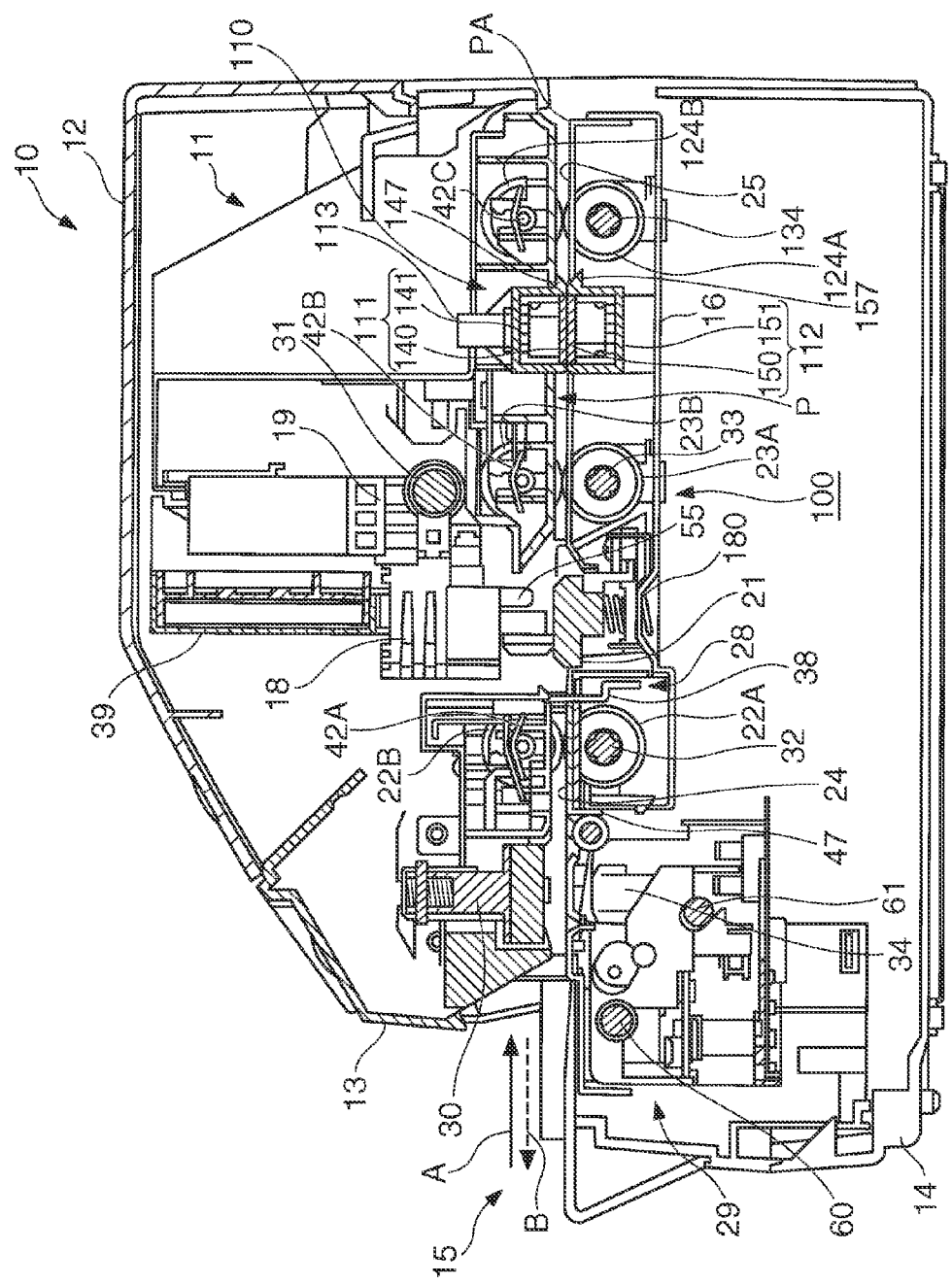
FIG. 3 is a side section view of the print assembly.

FIG. 1 is a front oblique view showing the appearance of a dot impact printer according to a preferred embodiment of the invention. FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon cartridge (not shown in the figure) therebetween in order to form dots on the recording surface of the recording medium S. The dot impact printer 10 has an optical reader (scanner) 110 (FIG. 3) and thus also functions as an optical reading device that can optically read text, symbols, images, and other content presented on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to as simply checks herein) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the check surface. A passbook is a bound booklet of plural blank pages that can be printed on when the passbook is open. A magnetic stripe is typically rendered on the outside surface of one of the passbook covers.

Note that of the four sides of a rectangular recording medium S, the edge on the side that is inserted to the dot impact printer 10 is referred to herein as the leading edge or end, and the edge on the opposite side as the leading end is referred to as the trailing edge or end.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent to the dot impact printer 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the subscanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded up inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is urged toward the recording head 18 and elastically supported by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media transportation mechanism (transportation means) 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media transportation motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media transportation motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media transportation motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media transportation motor 26 rotates forward, the first drive roller 22A, second drive roller 23A, and third drive roller 124A shown in FIG. 3 convey the recording medium S in the sub-scanning direction Y inside the printer assembly 11 as denoted by arrow A in the figure, and convey the recording medium S in the direction in which it is discharged from the printer assembly 11 as indicated by arrow B in the figure when the media transportation motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls dot impact printer 10 operations, including driving the media transportation motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the transportation path P in front of the first drive roller 22A. The media edge sensors 47 are reflective sensors having a light-emitting unit that emits light toward the transportation path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted to the transportation path P when the photodetection units of all insertion detection sensors 47 sense light and then photodetection by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 (first scanning unit) that reads information printed or otherwise presented on the top surface of the recording medium S, and a second scanner 112 (second scanning unit) disposed opposite the first scanner 111 that similarly reads information printed or otherwise presented on the bottom surface of the recording medium S. The recording medium S is normally inserted from the manual insertion opening 15 so that the side on which the MICR information is printed is on the bottom.

The first scanner 111 and second scanner 112 are optical image sensors that are disposed between the second drive roller 23A and third drive roller 124A and continuously read information on the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that illuminates the scanning area of the recording medium S with light output from an LED or other light source, a plurality of photosensors (not shown in the figure) arrayed in a single row in the main scanning direction (X axis), and an output unit (not shown in the figure) that outputs the signals from the photosensors to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the top of glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner 111 is pushed up by the conveyed recording medium S and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The photosensors (not shown in the figure) of the first scanner 111 and second scanner 112 are arrayed in a row in the main scanning direction of the dot impact printer 10, and scan lines extending in the main scanning direction. The photosensors of the first scanner 111 and second scanner 112 are disposed across a wider range in the main scanning direction than the printing range of the recording head 18, and can scan a wider range than any recording medium that can be printed on by the dot impact printer 10. The optical reader 110 can therefore read the entire surface of any recording medium S that can be used in the dot impact printer 10.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the subscanning direction Y) is set according to the scanning resolution in the main scanning direction, and the conveyance speed of the recording medium S during scanning is adjusted according such parameters as the scanning resolution and how fast the photosensor output signals can be processed.

Figure 4:
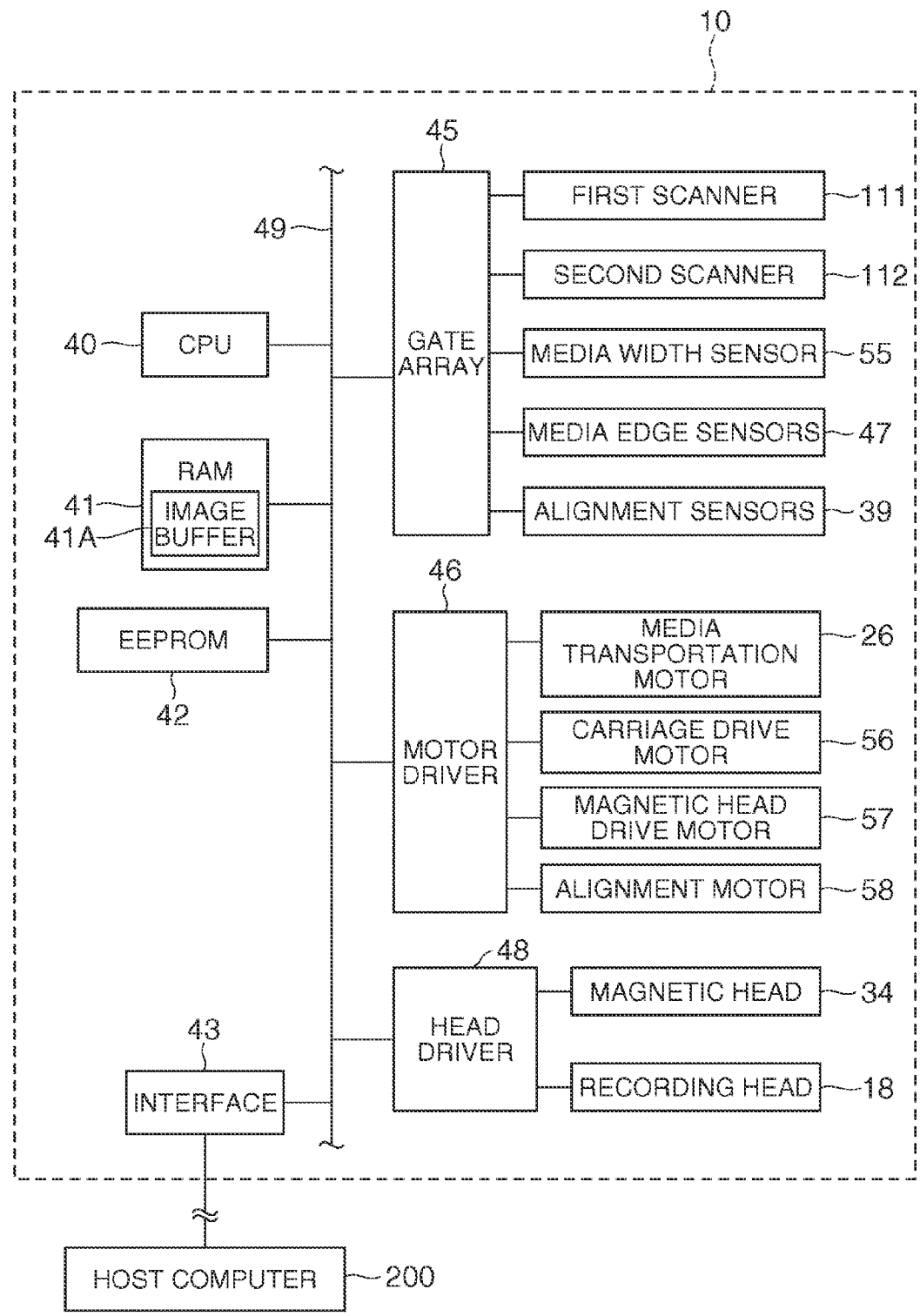
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 includes a CPU 40 as a control unit that controls the dot impact printer 10 based on a control program, RAM 41 that temporarily stores data and a control program read from EEPROM 42 by the CPU 40, EEPROM 42 that stores the control program executed by the CPU 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected.

RAM 41 functions as a temporary storage unit, and renders an image buffer 41A that temporarily stores the image data captured by the optical reader 110. Note that the image buffer 41A may be rendered in RAM managed by the gate array 45. In this case the scanned image data can be stored from the optical reader 110 through the gate array 45 to the image buffer 41A without involving control by the CPU 40.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the CPU 40. The first scanner 111 and second scanner 112 optically read the surface of the recording medium S using a CIS, supply the detection voltages from each pixel of the CIS to the gate array 45, and the gate array 45 quantizes the analog voltages supplied from the first scanner 111 and second scanner 112 and outputs the resulting digital data to the CPU 40.

The motor driver 46 is connected to the media transportation motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensors 47 are connected to the recording head 18 and magnetic head 34, and supply drive current to the recording head 18 to drive the recording wires to print. The media edge sensors 47 also output drive current for reading and writing to the magnetic head 34, and when reading magnetic data detect and output the detection voltage (analog voltage) from the magnetic head 34 as digital data to the CPU 40.

The CPU 40 acquires detection signals from the sensors and drives the motors to convey the recording medium S by means of the gate array 45, motor driver 46, and head driver 48 based on a control program stored in EEPROM 42, and drives the heads to record on the recording medium S.

The CPU 40 also conveys the recording medium S by means of the media transportation mechanism 100, and reads the surface of the recording medium S by means of the gate array 45 and first scanner 111 and second scanner 112. While scanning, the CPU 40 temporarily stores the data input from the gate array 45 sequentially to a buffer (storage unit) rendered in RAM 41. The CPU 40 also reads and outputs the image data stored in the buffer (not shown in the figure) to the host computer 200 through the interface 43.

Figure 5A:
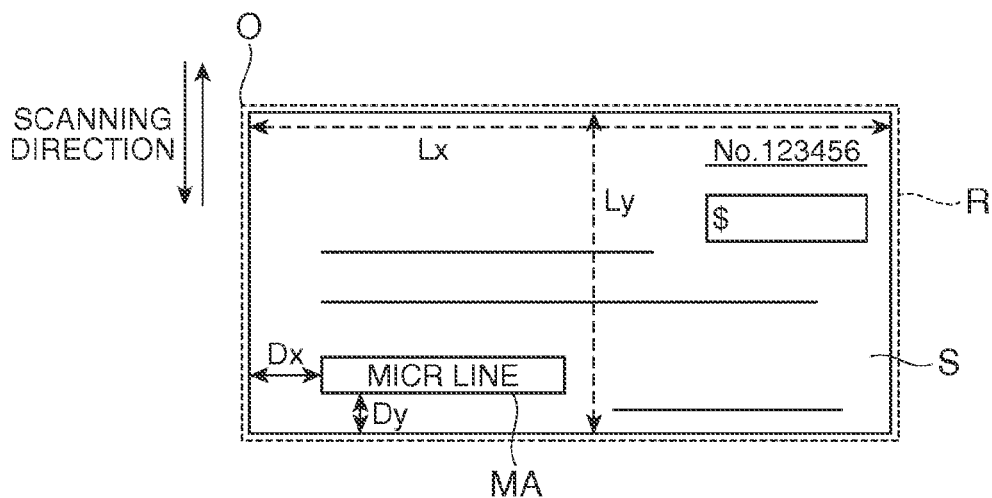
FIG. 5 shows an example of a scanned medium.
Figure 5B:
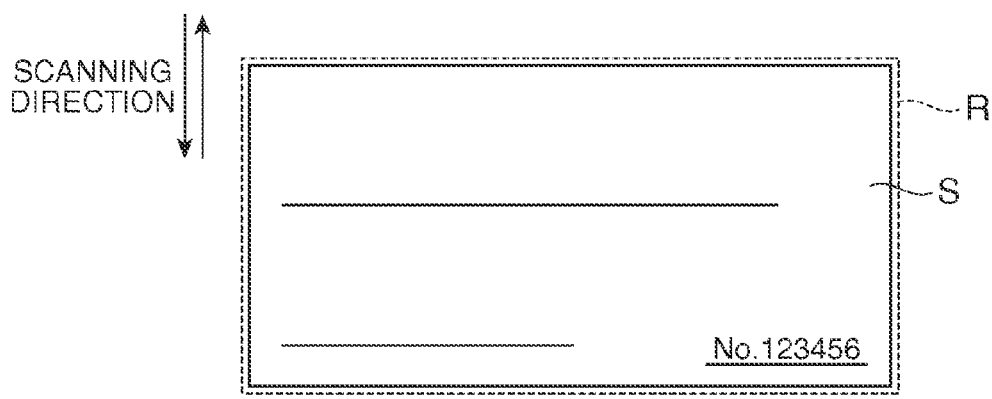

FIG. 5 shows an example of a check as a recording medium S that is processed by the dot impact printer 10. FIG. 5A shows the front and FIG. 5B shows the back of the check.

The check used as the recording medium S is a horizontally long rectangle, is inserted to the dot impact printer 10 with one of the long sides at the leading edge, and is conveyed in the direction of the short side as shown in the figure. Note that the length (width) of the long side of the recording medium S is Lx below, and the length (height) of the short side is Ly.

As shown in FIG. 5A, a check serial number is printed on the front of the recording medium S, which also has fields for writing or printing the date, check amount, payee, name and address of the payer, and a signature line. A MICR area MA where MICR characters are printed is also provided on the bottom left part of the check. The check serial number may also be printed on the front of the recording medium S.

As shown in FIG. 5B, the check serial number is printed on the back of the check, and fields for writing or printing the account number and the name of the financial institution on which the check is drawn are also provided.

The recording medium S shown in FIG. 5 is inserted from the manual insertion opening 15 to the dot impact printer 10 with the side shown in FIG. 5A facing down and the back shown in FIG. 5B facing up. The front side shown in FIG. 5A is therefore the bottom surface as referred to herein and is read by the second scanner 112, and the back side shown in FIG. 5B is the top surface read by the first scanner 111.

The scanning range R of the first scanner 111 is set according to the size of the recording medium S, and is slightly greater than the width Lx and height Ly of the recording medium S as indicated by the dotted line in FIG. 5B. The width and height of the scanning range R are sized to add a scanning margin to the width Lx and height Ly of the recording medium S, and this scanning margin is typically a few millimeters, for example. The first scanner 111 can therefore optically scan the entire back of the recording medium S. The magnetic head 34 also reads the MICR text in the MICR area MA shown in FIG. 5A.

The scanning range R of the second scanner 112 is similarly set according to the size of the recording medium S, and is slightly greater than the width Lx and height Ly of the recording medium S as indicated by the dotted line in FIG. 5A. In this embodiment of the invention the width and height of the scanning range R are sized to add a scanning margin to the width Lx and height Ly of the recording medium S, and this scanning margin is typically a few millimeters, for example. The first scanner 111 can therefore optically read the entire back of the recording medium S.

The dot impact printer 10 reads the recording medium S by means of the optical reader 110 while conveying the recording medium S forward or reverse in the direction of the short side. In this case, the direction in which the recording medium S is conveyed while scanning is automatically determined so that scanning the part to be read can be completed with the shortest possible transportation distance as further described below.

Commands are sent from the host computer 200 to the dot impact printer 10 through the interface 43, and the size (Lx, Ly) of the recording medium S to be scanned is set by command. The CPU 40 identifies the size of the recording medium S based on the command received from the host computer 200 and sets the scanning range R accordingly. Information identifying the location of the MICR area MA on the recording medium S is also contained in the command sent from the host computer 200. The location of the MICR area MA may be specified by the distance Dx from a short side of the recording medium S and the distance Dy from a long side, for example. The CPU 40 controls the motor driver 46 and head driver 48 based on the received command, and drives the magnetic head drive motor 57 to read with the magnetic head 34.

The commands sent from the host computer 200 to the dot impact printer 10 include setup commands, a start scanning (reading) command, and a paper discharge command.

The setup commands are commands for specifying the scanning resolution of the optical reader 110, the scanning side (whether to scan the top or bottom), the scanning direction, the scanning mode (color or monochrome scanning), the number of gray levels if monochrome scanning is selected, the LED output color if monochrome scanning is selected, and the scanning area (the coordinates of the start and end points) if only part of the scanning range R is to be scanned. After receiving the setup command, the CPU 40 extracts the values specified in the setup command as the setting.

The start scanning command is a command that tells the dot impact printer 10 to start the scanning process. The start scanning command includes information specifying the type of scanning operation, that is, a full scan that reads all of the scanning range R, or a partial scan that reads only the scanning area specified by the setup command. When the CPU 40 receives the start scanning command, it controls the gate array 45 and motor driver 46 to start scanning by the optical reader 110.

The discharge command is a command that specifies whether to discharge the recording medium S from the manual insertion opening 15 or paper exit 20 after scanning is completed, and includes a discharge instruction and information specifying the discharge direction (the manual insertion opening 15 or paper exit 20). When the CPU 40 receives the discharge command, it discharges the recording medium S from the side specified by the discharge command.

The scanning operations of the dot impact printer 10 when conveying the recording medium S forward and when conveying the recording medium S in reverse are described next.

Figure 6A:
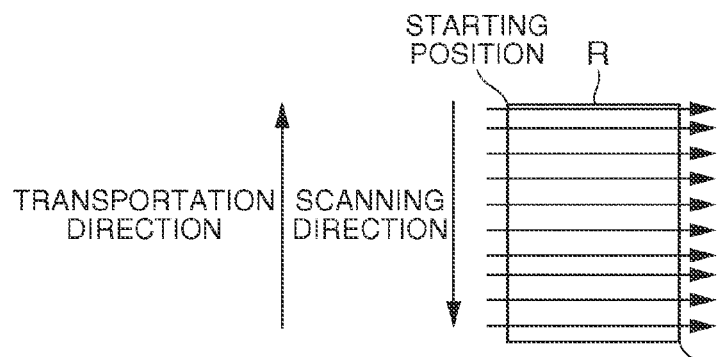
FIG. 6 describes the scanning operation of a dot impact printer when scanning forward.
Figure 6B:
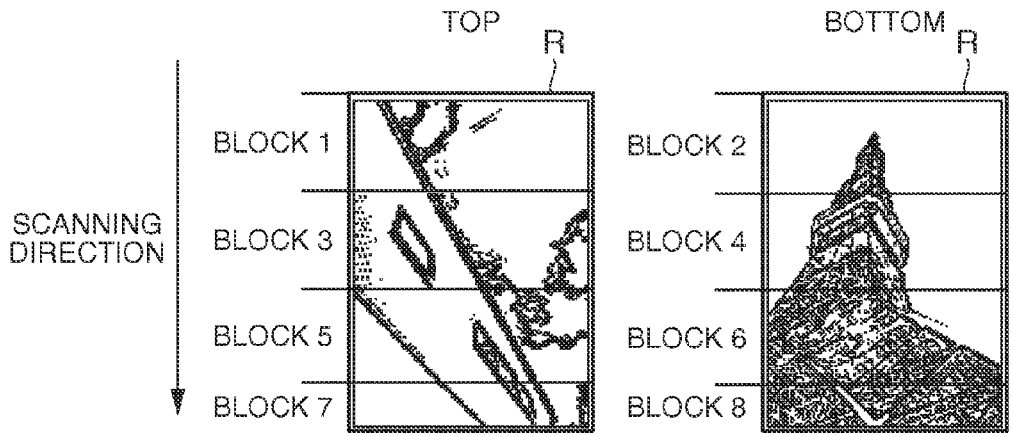
Figure 6C:
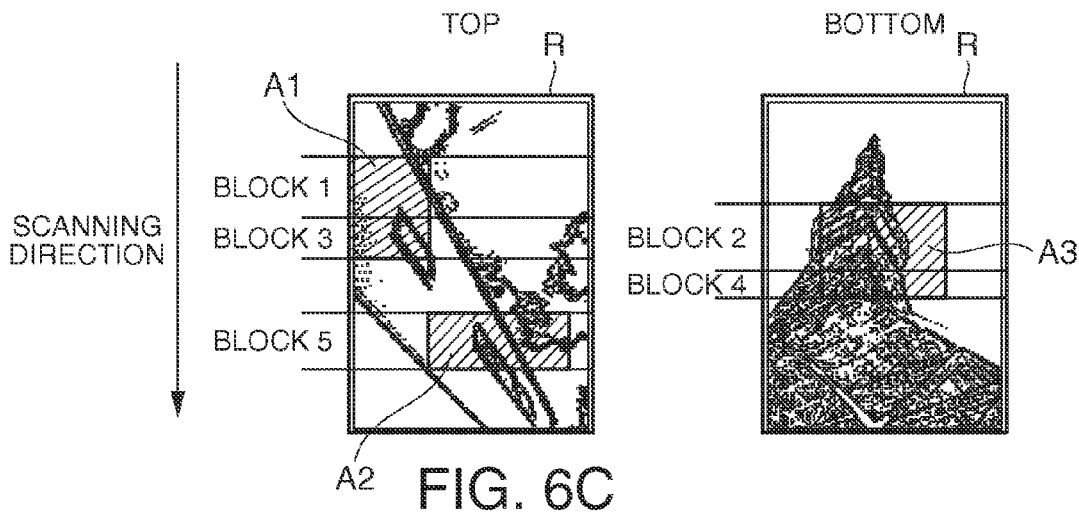

FIG. 6 illustrates the forward scanning operation of the dot impact printer 10. FIG. 6A shows the scanning direction, FIG. 6B schematically describes scanning by the dot impact printer 10 in the full scan mode, and FIG. 6C schematically describes operation in the partial scan mode.

When the dot impact printer 10 scans in the normal (forward) direction, the recording medium S passes the optical reader 110 and is scanned by the first scanner 111 and second scanner 112 while traveling from the front (the left in FIG. 2) of the dot impact printer 10 to the rear (the right in FIG. 2).

In this case, as shown in FIG. 6A, the recording medium S is scanned from the leading end of the scanning range R (the top in the figure) to the trailing end (the bottom in the figure). The image data of the one line scanned by the first scanner 111 and second scanner 112 is output to the gate array 45 line by line sequentially from the left end of the scanning range R. The left end of the leading edge of the scanning range R is therefore the scanning start position, and the right end of the trailing edge is the end position.

When a full scan is indicated by the command sent from the host computer 200, the CPU 40 divides the scanning range R into segments of a predetermined length in the scanning direction (subscanning direction Y) as shown in FIG. 6B. These segments are referred to as blocks. The scanning range R of the first scanner 111 and the scanning range R of the second scanner 112 are each segmented into plural blocks of a specified length, and the blocks are sequentially numbered alternately top and bottom from the leading end of the scanning direction. More specifically, the first block of the scanning range R on the top surface is block 1, the first block of the scanning range R on the bottom surface is block 2, and the remaining blocks are similarly numbered alternating top and bottom in the scanning direction 3, 4, . . . 8 as shown in the figure. The length of the last block is the length of the block remaining after dividing the scanning range R into blocks of the specified length.

Each block is the size of the process unit in which the image data from the first scanner 111 and second scanner 112 is sent to the host computer 200. That is, each time the image data for one block is stored in the image buffer 41A in RAM 41, the CPU 40 sends the image data for that block to the host computer 200. The specified length, that is, the length of each block in the transportation direction (scanning direction) is determined according to the capacity of the image buffer 41A reserved in RAM 41. For example, if the image buffer 41A has sufficient capacity to store 300 lines of full-color image data at the maximum resolution of 600 dpi, the length of one block is set appropriately to a length of 300 lines or less.

When scanning in the full scan mode, the CPU 40 controls the motor driver 46 to drive the media transportation motor 26 to convey the recording medium S at a specified speed while controlling the gate array 45 and driving the light sources of the first scanner 111 and second scanner 112 to generate the scanned image data based on the detection values from the photosensors and storing the scanned image data line by line to the image buffer in RAM 41.

The CPU 40 continues this operation without interrupting conveying the recording medium S until the entire scanning range R is read by the first scanner 111 and second scanner 112. When scanning any block is completed (ends) during this operation and the image data for one block is stored in the image buffer 41A in RAM 41, the CPU 40 reads and sends the image data for that block from the image buffer 41A to the host computer 200, and then deletes the scanned image data from the image buffer 41A after transmission is completed.

Each time scanning one block is completed, the CPU 40 sends the captured image data to the host computer 200 as described above. Note that the order in which the image data captured from each block is sent is the order in which scanning is completed, and is not limited to the order of the block numbers.

When the CPU 40 sends the scanned image data to the host computer 200, it also sends additional information in a header indicating which side was scanned (top or bottom), the size of the scanned block, the block number, and the data length. If the image data is large, the CPU 40 can send the image data for one block in smaller segments, in which case information enabling the host computer 200 to rejoin the image data segments may also be added to the header.

When the command received from the host computer 200 specifies a partial scan, the CPU 40 sets the area to be scanned according to the scanning area specified in the scanning range R by the setup command as shown in FIG. 6C. In the example shown in FIG. 6C, areas A1 and A2 are set in the scanning range R of the top, and area A3 is set in the scanning range R on the bottom side of the recording medium S.

The CPU 40 configures the scan blocks according to the arrangement of the areas to be scanned. If the length of an area in the scanning direction is shorter than the predetermined length of one block described above, the CPU 40 produces one block for the one area. The leading end and the trailing end of this block match the leading end and trailing end of the area. If the length of the area is greater than the predetermined block length, the CPU 40 segments the scanning area into blocks of the specified length starting from the leading end of the area in the scanning direction. In the example shown in FIG. 6C, areas A1 and A3 exceed the predetermined block length, and area A1 is therefore divided into blocks 1 and 3, and area A3 is divided into blocks 2 and 4. The block numbers are assigned sequentially from the leading end of each block alternating top and bottom in the same way as in the full scan mode.

Note that when there are plural scan areas defined across the width of the scanning range R, and the areas overlap in the scanning direction, all of the overlapping areas are treated as a single block. If the length of such a block in the scanning direction exceeds the maximum length of one block, the block is segmented into plural blocks in the scanning direction.

The CPU 40 then starts scanning areas A1 to A3 in the scanning range R. The CPU 40 controls the gate array 45 and motor driver 46 and continues the scanning operation without interrupting transportation of the recording medium S until all areas have been scanned by the first scanner 111 and second scanner 112. When reading any block on the top or bottom is completed and the image data for that block is stored in the image buffer 41A in RAM 41 during this operation, the CPU 40 reads and sends the image data for that block from the image buffer 41A to the host computer 200, and then deletes the image data from the image buffer 41A after data transmission is completed. The transmission sequence in this case is the same as during the full scan mode, that is, in the order in which block scanning is completed and is not limited to the order of the block numbers.

When the CPU 40 sends the scanned image data to the host computer 200, it also sends additional information in a header indicating which side was scanned (top or bottom), the size of the scanned block, the block number, the data length, the area number, and the coordinates of the beginning and end positions of the area. If a single area is divided into plural blocks, information for rejoining the blocks constituting each area may also be included. In addition, if plural areas are contained in one block, the CPU 40 divides the scanned image data for the block into the individual areas, and sends the image data for each area to the host computer 200. If the size of the captured image data is large, the data can also be divided into smaller units for transmission to the host computer 200 in this partial scan mode.

The host computer 200 receives the scanned image data sent from the dot impact printer 10, and reconstructs the scanned image block by block based on the header information. In addition, when the host computer 200 specifies the full scan mode in the setup command sent to the dot impact printer 10, it reproduces images for the entire scanning range R of both the top and bottom sides by rejoining the blocks. In addition, when the partial scan mode is specified by the setup command, the host computer 200 reproduces the scanned image data for each area by rejoining the blocks when a single area is divided into plural blocks, and using the scanned image data contained in each block as is when a single block constitutes a single area.

Figure 7A:
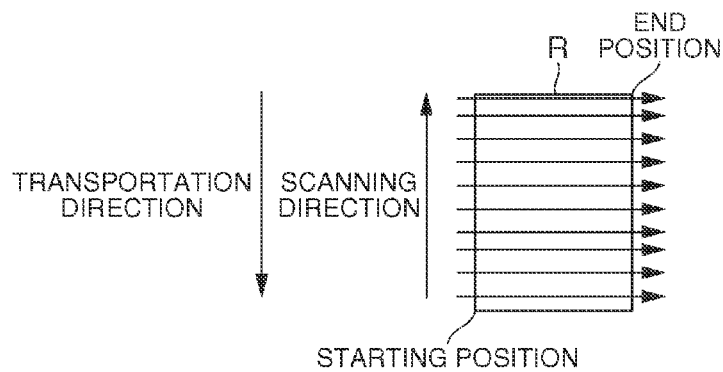
FIG. 7 describes the scanning operation of a dot impact printer when scanning in reverse.
Figure 7B:
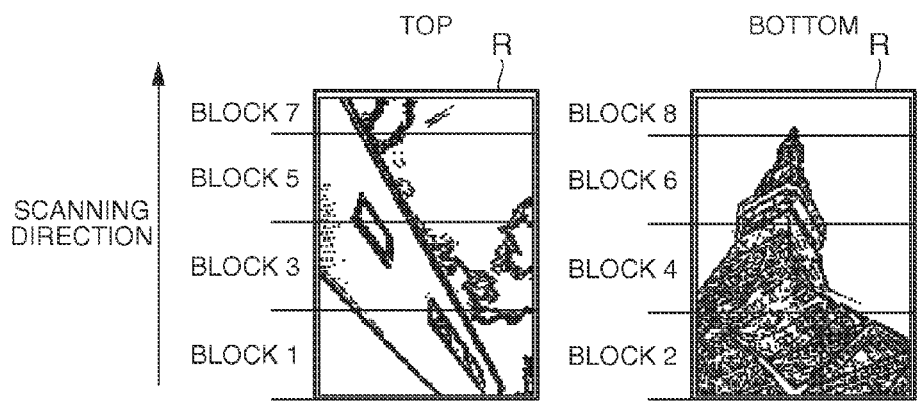

FIG. 7 illustrates the reverse scanning operation of the dot impact printer 10. FIG. 7A shows the scanning direction, FIG. 7B schematically describes scanning in the full scan mode, and FIG. 6C schematically describes operation in the partial scan mode.

When the dot impact printer 10 scans in the reverse direction, the recording medium S passes the optical reader 110 and is scanned by the first scanner 111 and second scanner 112 while traveling from the rear of the dot impact printer 10 to the front. In this case scanning proceeds from the trailing end of the scanning range R as shown in FIG. 7A (the bottom end in the figure) to the leading end (the top end in the figure). Because the scanned image of one line captured by the first scanner 111 and second scanner 112 is output sequentially from the left end (the base of the arrow) to the right end (the tip of the arrow) of the scanning range R through the gate array 45 one line at a time, the left end of trailing edge of the scanning range R is the scanning start position and the right edge of the leading end is the end position.

When scanning in reverse in the full scan mode, the scanning range R is segmented into blocks from the trailing end as shown in FIG. 7B. The block numbers are assigned sequentially from the end at the leading edge during scanning while alternating top and bottom. Other aspects of the operation are the same as during a full scan in the forward direction.

Figure 7C:
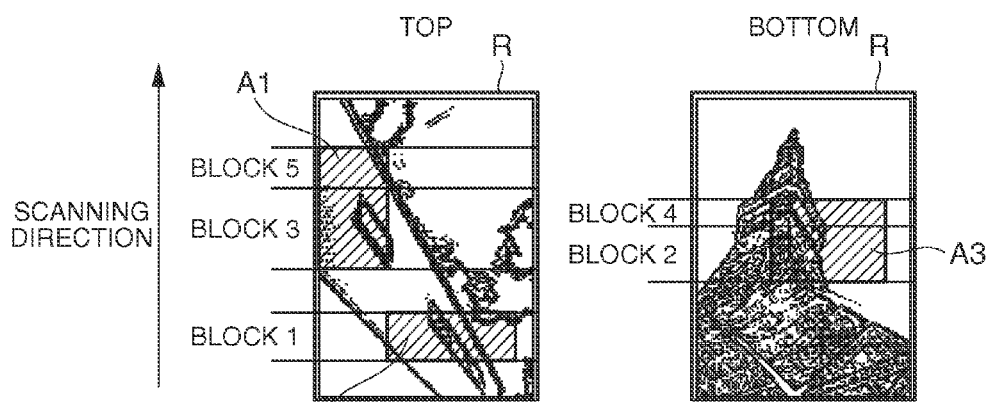

When scanning in reverse in the partial scan mode, the areas to be scanned are configured based on the setup command received from the host computer 200 as shown in FIG. 7C, and the areas are segmented into blocks from the trailing end of the scanning range R, which is the leading end in the scanning direction. Areas that exceed the maximum length of one block are divided into blocks of the specified length referenced to the trailing end of the scanning range R. Other aspects of the operation are the same as during a partial scan in the forward direction.

The top and bottom of the scanned image data captured in the reverse direction is inverted from the image data captured when scanning forward. As a result, the CPU 40 of the dot impact printer 10 may execute a process to rotate the image data before transmission to the paper exit 20, but because the host computer 200 that sent the setup command has information about the scanning direction, the host computer 200 can use this information to invert the top and bottom of the scanned image data.

Figure 8:
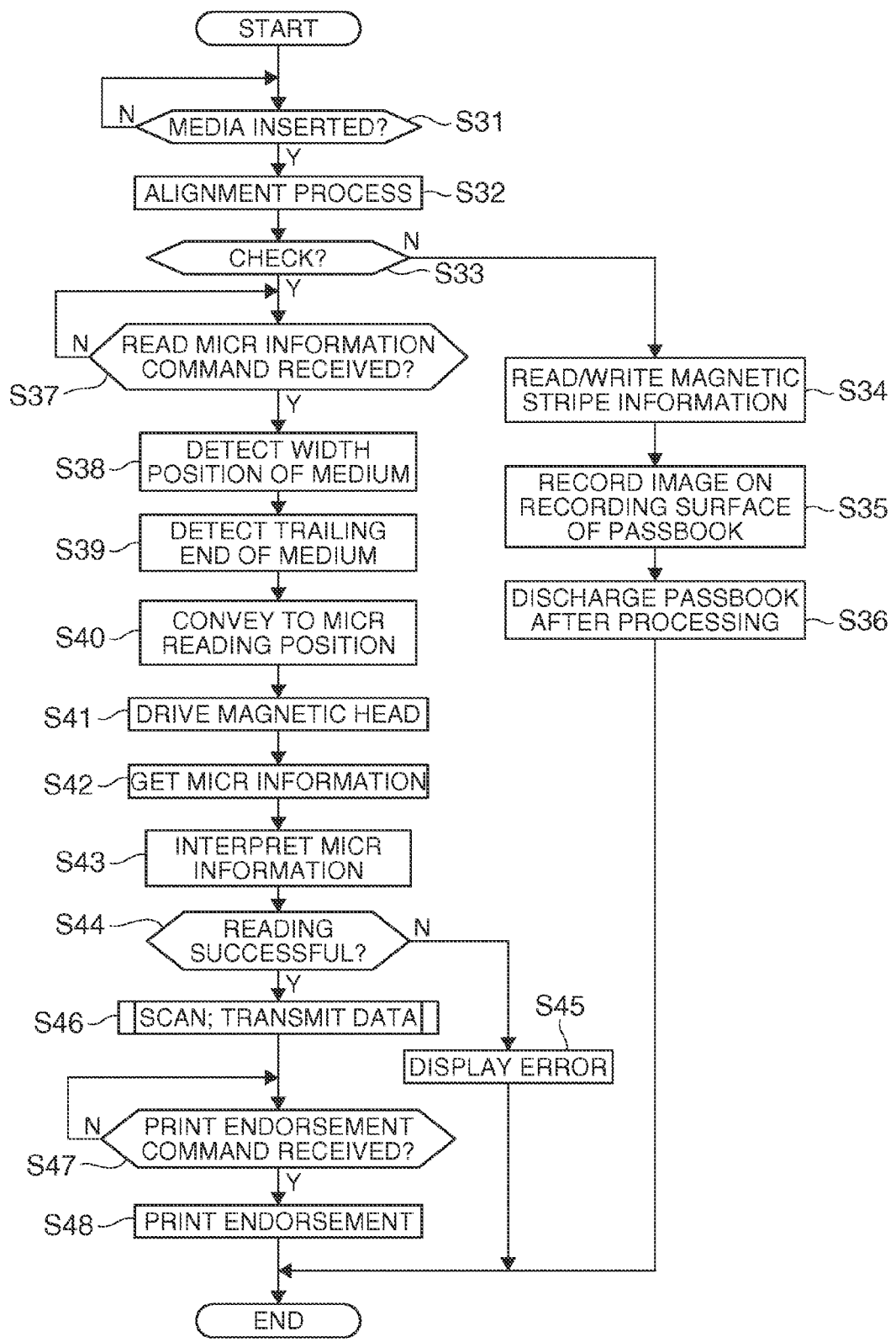
FIG. 8 is a flow chart of the operation of the dot impact printer.

FIG. 8 is a flow chart describing the operation of the dot impact printer 10 according to this embodiment of the invention.

When a recording medium S is inserted to the manual insertion opening 15 and the media edge sensors 47 detect the leading end of the recording medium S (step S31 returns Yes), the CPU 40 of the dot impact printer 10 drives the alignment plate 38 to protrude into the transportation path P of the recording medium S and operates the media transportation motor 26 to align the recording medium S (step S32).

The CPU 40 determines whether the detected recording medium S is a check or a passbook (step S33).

The CPU 40 can determine the type of recording medium S based on information acquired from the host computer 200. Alternatively, the CPU 40 can detect the locations of the leading end and side of the recording medium S using the media edge sensors 47 and media width sensor 55, and determine the type of recording medium S based on this position and size information. Further alternatively, based on the positions of the leading end and side of the recording medium S detected using the media edge sensors 47 and media width sensor 55, the CPU 40 may attempt to read the MICR information using the magnetic head 34, and determine the type of recording medium S by determining whether or not MICR information is found in the MICR area MA by this reading attempt. In this embodiment of the invention the CPU 40 acquires from the host computer 200 information identifying the type of recording medium S (check or passbook), information such as the size of the check if the recording medium S is a check, information about the location of the MICR area MA, and information about the transportation distance, and determines based on the received information whether the recording medium S is a check or a passbook.

If the decision of step S33 is that the recording medium S is not a check (step S33 returns No) and the CPU 40 determines that the recording medium S is a passbook, for example, it conveys the recording medium S to the position where the magnetic stripe on the passbook can be read by the magnetic head 34, and then reads and/or writes the magnetic stripe by means of the magnetic head 34 (step S34).

The CPU 40 then conveys the recording medium S to the position of the recording head 18, records on the recording surface by means of the recording head 18 (step S35), and then discharges the recording medium S from the manual insertion opening 15 (step S36) to complete the process.

If the decision of step S33 is that the recording medium S is a check (step S33 returns Yes), the CPU 40 determines if a MICR information read command was received from the host computer 200 (step S37).

If the decision of step S37 is that a MICR read command was received (step S37 returns Yes), the CPU 40 retracts the alignment plate 38 from the transportation path P, and conveys the recording medium S by means of the media transportation mechanism 100 until at least the leading end of the recording medium S is directly below the media width sensor 55. The CPU 40 then drives the carriage drive motor 56 (FIG. 5) to move the carriage 19 in the main scanning direction, and detects the widthwise position of the recording medium S based on the output signals from the media width sensor 55 and the position of the carriage 19 in the main scanning direction (step S38).

The CPU 40 also monitors the output signal from the media edge sensors 47 while conveying the recording medium S by means of the media transportation mechanism 100, and detects the trailing end of the recording medium S (step S39).

The CPU 40 then conveys the recording medium S by means of the media transportation mechanism 100 to the position where the MICR area MA can be read by the magnetic head 34 (step S40), controls the motor driver 46 to operate the magnetic head drive motor 57, and reads the MICR text in the MICR area MA by means of the magnetic head 34 (step S41).

The MICR information read by the magnetic head 34 is then digitized by the gate array 45, and the CPU 40 acquires the output digital data (step S42), and extracts the character data from the digital data and converts it to text information (step S43). Whether the number of uninterpretable characters in the extracted text exceeds a predetermined number, or whether the character count is within the range of the predetermined count and reading the MICR information was successful, is then determined (step S44).

If the number of characters exceeds the predetermined count (step S44 returns No), the CPU 40 outputs an error and discharges the recording medium S (step S45), and ends operation. The error can be reported in step S45 using a display unit disposed to the dot impact printer 10, sending information indicating that an error occurred to the host computer 200, or using both methods.

If the decision of step S44 is that the number of uninterpretable characters does not exceed the preset count and reading was successful (step S44 returns Yes), the CPU 40 scans the recording medium S using the optical reader 110 and sends the captured image data to the host computer 200 (step S46).

The CPU 40 then waits to receive a command to print an endorsement on the back from the host computer 200 (step S47). When an endorsement print command is received (step S47 returns Yes), the CPU 40 reverses the media transportation motor 26 to convey the recording medium S to below the recording head 18, and then drives the carriage drive motor 56 and recording head 18 to print an endorsement indicating that the check was processed on the back of the recording medium S (step S48). When printing the endorsement is completed, the CPU 40 drives the media transportation motor 26 again to discharge the recording medium S from the manual insertion opening 15 or the paper exit 20.

Figure 9:
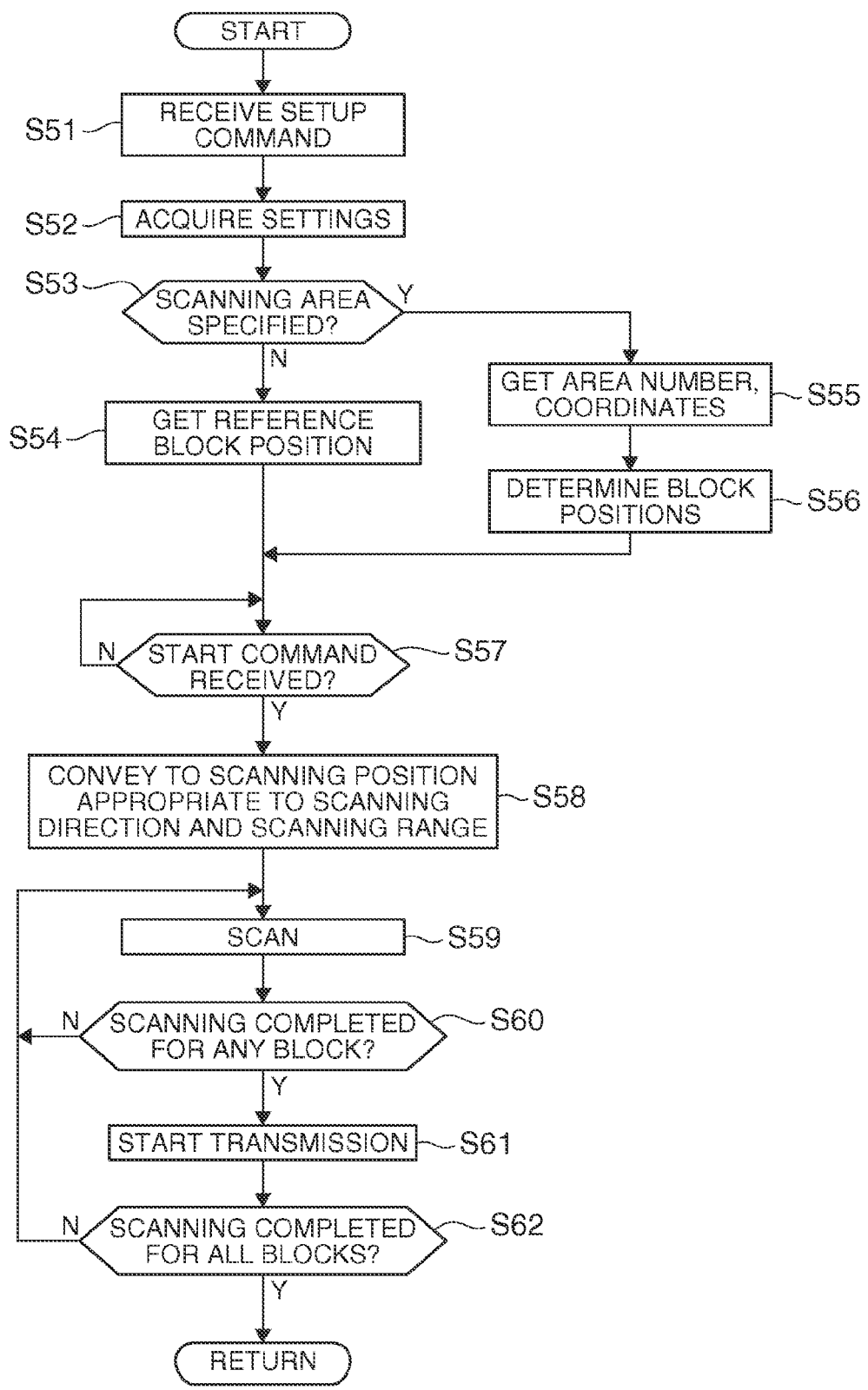
FIG. 9 is a flow chart of the scanning operation of the dot impact printer.

FIG. 9 is a flow chart of the scanning operation executed by the dot impact printer 10, and describes the operation executed in step S46 in FIG. 8 in further detail.

The CPU 40 receives the setup command sent from the host computer 200 (step S51), and acquires the settings content specified by the setup command (step S52).

The CPU 40 determines if the area to be scanned is specified in the setup command (step S53). If the scanning area is not specified (step S53 returns No), it acquires the position of the block referenced to scan the entire scanning range R based on the scanning direction specified in the setup command (step S54). The position of the reference block used for a full scan of the scanning range R is stored in EEPROM 42, for example.

If a specific scanning area is specified in the setup command (step S53 returns Yes), the CPU 40 acquires the area numbers and the coordinates of the start and end positions of each area (step S54), positions the areas in the scanning range R, and determines the positions of the blocks for each area based on the scanning direction specified in the setup command (step S56).

After the block positions are acquired or determined, the CPU 40 waits to receive a start scanning command from the host computer 200 (step S57), and when a start scanning command is received (step S57 returns Yes), the CPU 40 conveys the recording medium S to the scanning start position of the optical reader 110 by means of the media transportation mechanism 100 based on the scanning direction specified in the setup command, whether a full scan or partial scan is specified, the position of the specified area if a partial scan is specified, and the current position of the recording medium S (step S58).

The CPU 40 then scans while conveying the recording medium S by means of the first scanner 111 and second scanner 112 (step S59).

When the remaining capacity (available capacity) of the image buffer 41A goes below the stop buffering level while scanning and the remaining capacity in the image buffer 41A is then used, the CPU 40 interrupts buffering (scanning) so that the scanned data stored in the image buffer 41A and not yet transmitted is not overwritten by newly scanned image data.

In this case the stop buffering level is preferably set to the smallest possible storage capacity at which the remaining capacity in the image buffer 41A will absolutely not be depleted while scanning with the first scanner 111 and second scanner 112. This is so that the stop buffering process will be invoked as seldom as possible.

The stop (interrupt) buffering and resume buffering processes are described next.

Figure 10:
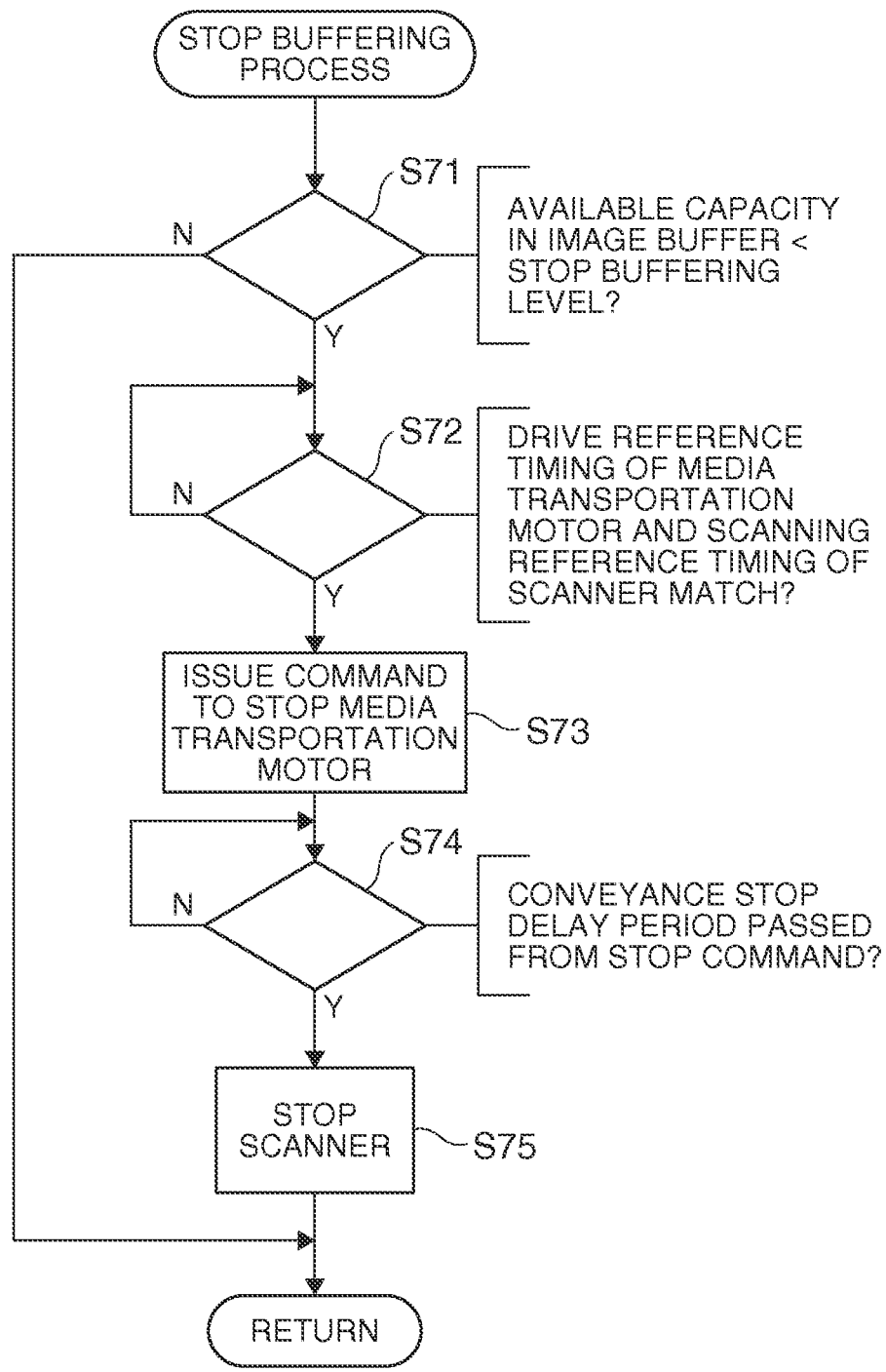
FIG. 10 is a flow chart of a process that stops (interrupts) buffering.
Figure 11:
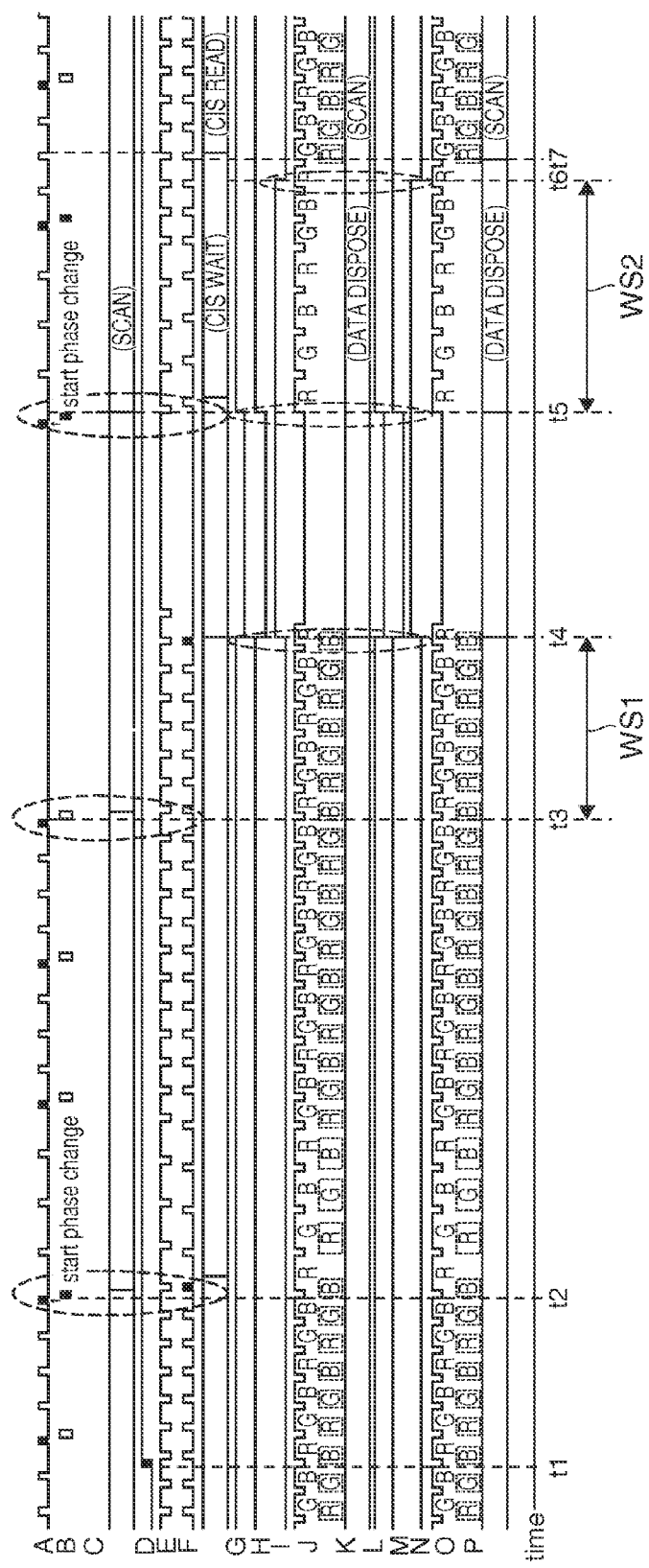
FIG. 11 is a timing chart of the buffering process.
Figure 12:
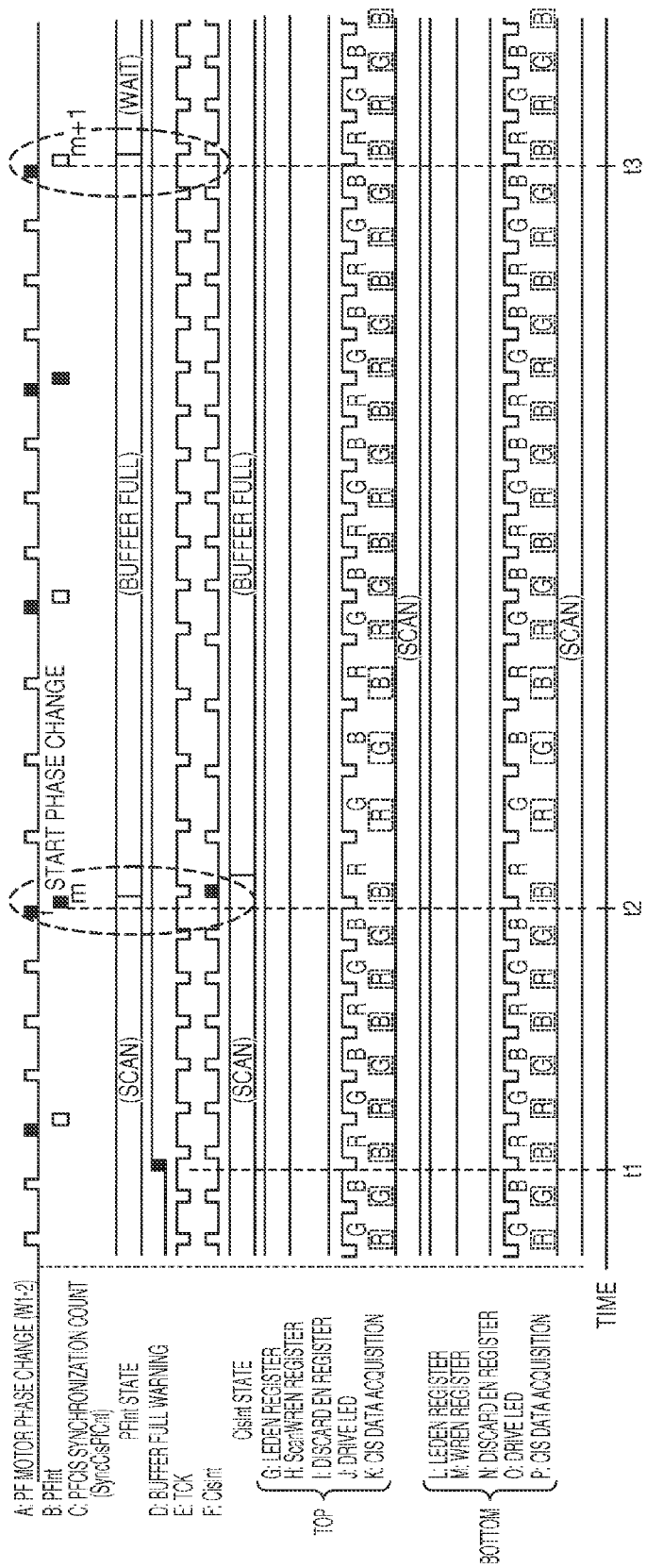
FIG. 12 is an enlarged view of part of FIG. 11.
Figure 13:
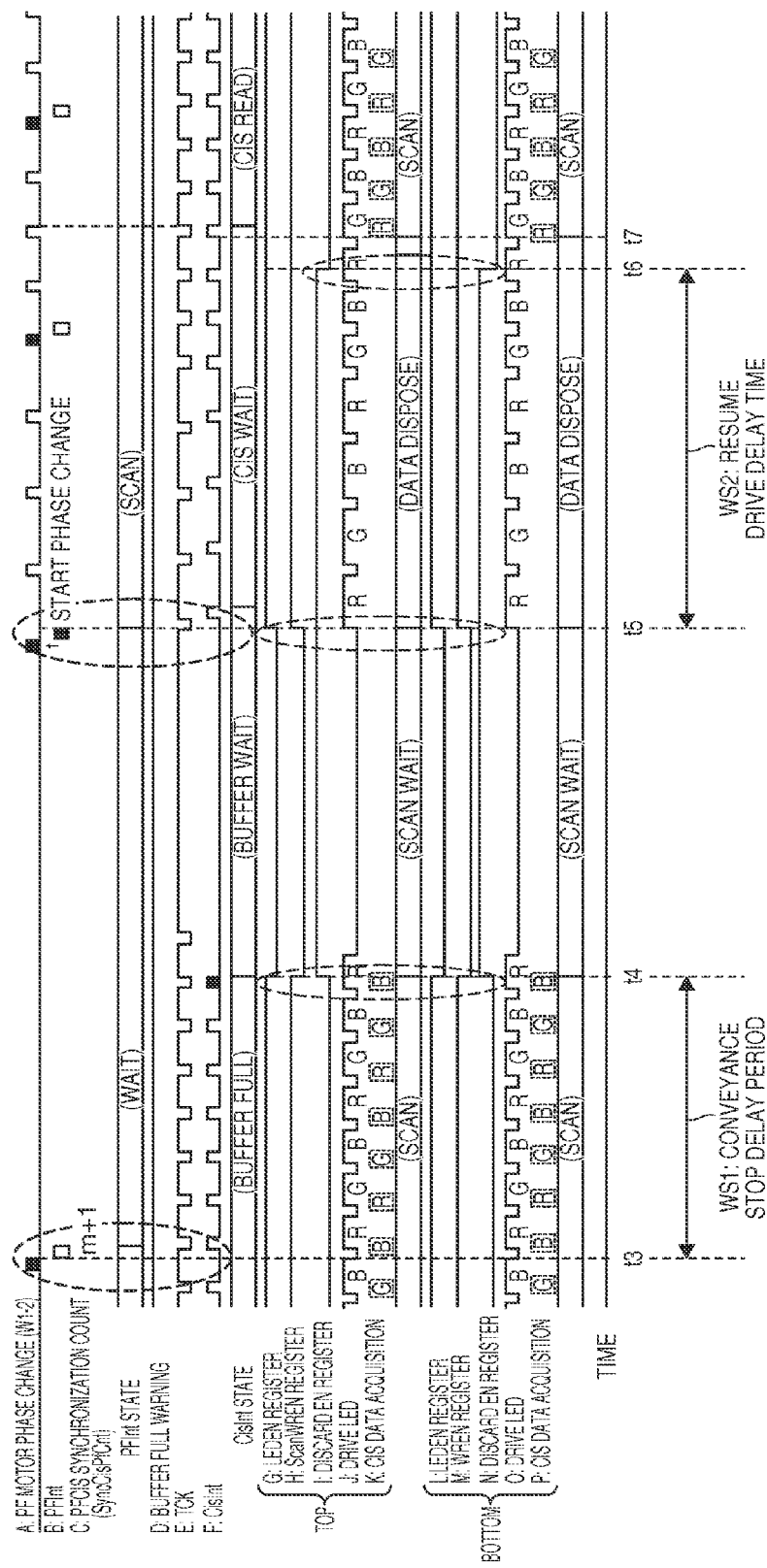
FIG. 13 is another enlarged view of part of FIG. 11.
Figure 14:
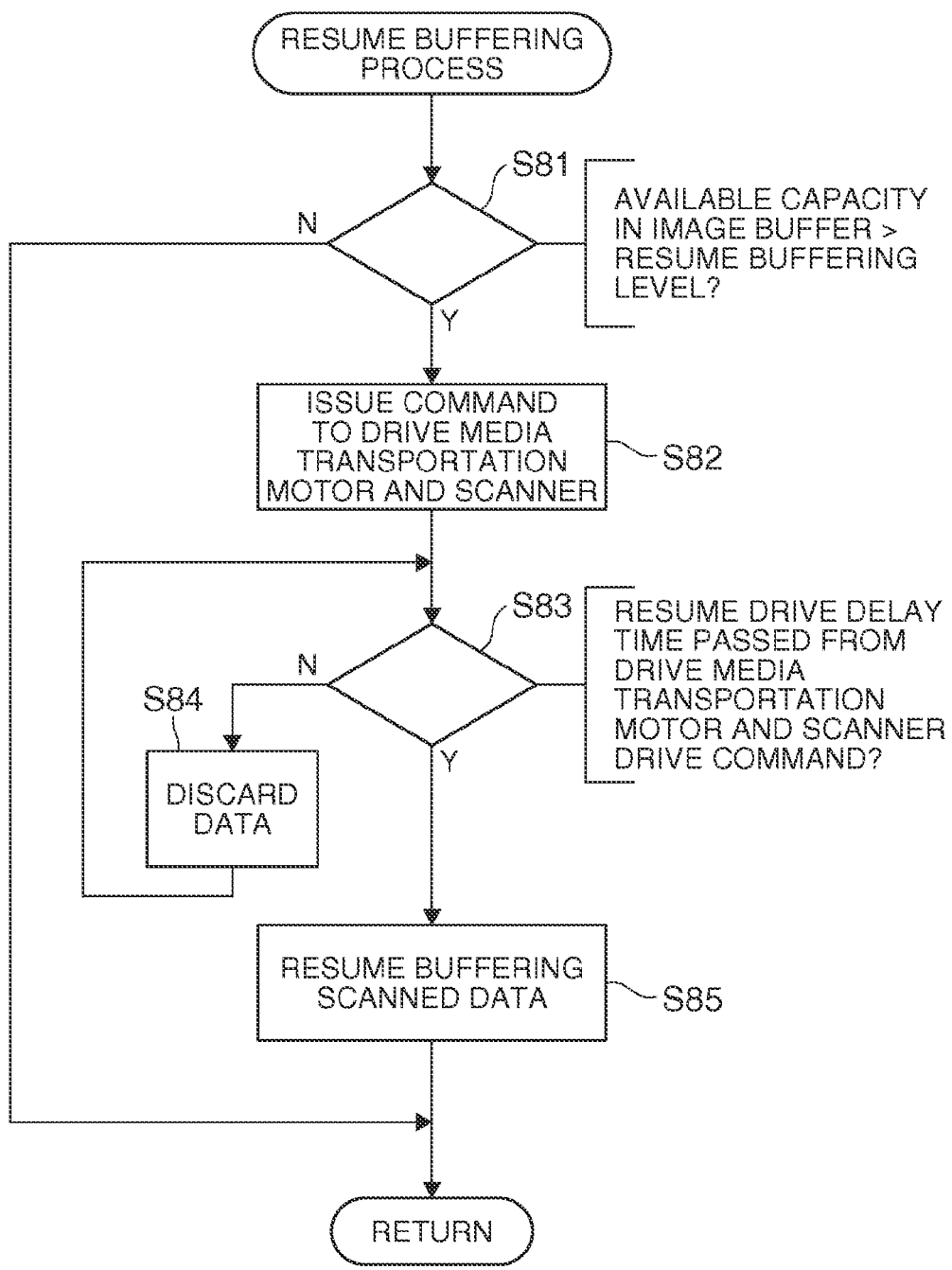
FIG. 14 is a flow chart of the resume buffering process.

FIG. 10 is a flow chart of the stop (interrupt) buffering process. FIG. 11 is a timing chart of the buffering process. FIG. 12 is a first enlarged view of part of FIG. 11, and FIG. 13 is a second enlarged view of part of FIG. 11. FIG. 14 is a flow chart of the resume buffering process.

Note that in FIG. 11 to FIG. 13 signal A is a signal denoting the phase change timing of the media transportation motor (PF motor) 26; signal B denotes the media transportation motor 26 initialization timing; count C denotes the timing at which the drive reference timing of the media transportation motor 26 and the scanning reference timing of the first scanner 111 and second scanner 112 match; and the buffer full warning signal D is a signal that goes high when the possibility that the image buffer 41A will soon become full is present.

The timing clock signal (TCK) E is a reference clock signal for various operations; scanning reference signal F is equivalent to the scanning reference timing of the first scanner 111 and second scanner 112; top LED enable signal G goes high to turn on the LED used as the light source that emits the scanning beam of the first scanner 111; top scanning write enable signal H goes low to prohibit writing to the image buffer 41A by the first scanner 111; discard top scan enable signal I goes high to enable discarding the scanned data output from the first scanner 111; top LED emit signal J goes high to turn on the LED used as the light source that emits the scanning beam of the first scanner 111; and top data acquisition signal K turns on when buffering the scanned data from the first scanner 111 to the image buffer 41A.

In addition, the bottom LED enable signal L goes high to turn on the LED used as the light source that emits the scanning beam of the second scanner 112; bottom scanning write enable signal M goes low to prohibit writing to the image buffer 41A by the second scanner 112; discard bottom scan enable signal N goes high to enable discarding the scanned data output from the second scanner 112; bottom LED emit signal O goes high to turn on the LED used as the light source that emits the scanning beam of the second scanner 112; and bottom data acquisition signal P turns on when buffering the scanned data from the second scanner 112 to the image buffer 41A.

As shown in FIG. 11 and FIG. 12, until time t1, the remaining capacity in the image buffer 41A exceeds the preset stop buffering level, the buffer full warning signal D is low, and scanning can proceed normally (corresponding to the period in FIG. 12 where the state of signal B corresponding to the initialization timing signal B of the media transportation motor 26 (the PFInt state) is denoted SCAN). At time t1, the remaining capacity of the image buffer 41A goes below the preset stop buffering level, and the buffer full warning signal D goes high.

For example, at time t2, if the timing of the falling edge of the phase change signal A of the media transportation motor 26 and the timing of the initialization timing signal B (equivalent to the drive reference timing) of the media transportation motor 26 match the timing when the PFCIS synchronization count C=m, which denotes the timing when the drive reference timing of the media transportation motor 26 and the drive reference timing of the first scanner 111 and second scanner 112 match, the CPU 40 determines if the remaining capacity of the image buffer 41A has gone below the preset stop buffering level (step S71).

Note that the period immediately following time t2 when phase changing starts is the buffer full warning period. This is shown in FIG. 12 by the PFInt state of the media transportation motor 26 initialization timing signal B going to BUFFER FULL. However, the state of the top data acquisition signal K and the state of the bottom data acquisition signal P remain set to SCAN as shown in FIG. 12 even after time t2 because data capture to the image buffer 41A continues.

If the decision of step S71 is that the remaining capacity of the image buffer 41A is not less than the preset stop buffering level (step S71 returns No), the CPU 40 has determined there is sufficient capacity remaining in the image buffer 41A to continue buffering the scanned data, therefore ends the interrupt buffering process, and continues scanning and buffering.

If the decision of step S71 is that the remaining capacity of the image buffer 41A is less than the preset stop buffering level (step S71 returns Yes), the CPU 40 stops conveying the recording medium S the first time the drive reference timing of the media transportation motor 26 and the drive reference timing of the first scanner 111 and second scanner 112 next match (step S73).

If buffering the scanned data to image buffer 41A continues in this case, the remaining capacity of the image buffer 41A will be depleted, and scanned data that has not been sent to the host computer will be overwritten. The CPU 40 therefore stops conveying the recording medium S to prevent this from happening.

More specifically, the CPU 40 instructs the motor driver 46 to stop conveying the recording medium S the first time the drive reference timing of the media transportation motor 26 matches the drive reference timing of the first scanner 111 and second scanner 112 after determining that the remaining capacity is less than the stop buffering level, that is, at time t3 when the drive reference timing of the media transportation motor 26 and the drive reference timing of the first scanner 111 and second scanner 112 match (the timing when PFCIS synchronization count C=m+1). This is shown in FIG. 12 by the PFInt state of the media transportation motor 26 initialization timing signal B going to WAIT.

However, when the CPU 40 sends a stop command to the motor driver 46 to stop the media transportation motor 26, there is a delay due to inertia, for example, between when the stop command is asserted and when conveying the recording medium S actually stops, and the recording medium S continues to be conveyed during this delay. The distance the recording medium S is conveyed during this delay is substantially constant, and in this embodiment of the invention the recording medium S is conveyed an amount equal to two pixels.

In this embodiment of the invention the estimated delay between stop command assertion and conveyance of the recording medium S actually stopping is called the conveyance stop delay period WS1 (=time t3 to t4). During this conveyance stop delay period WS1, first scanner 111 and second scanner 112 continue scanning, the RGB LEDs are driven to emit twice each as indicated by the LED emit signal O in FIG. 13, and scanned data for this two pixel image area is stored in the image buffer 41A. More specifically, from time t3 to time t4, the state of the top data acquisition signal K and the state of the bottom data acquisition signal P are set to continue capturing the scanned data to the image buffer 41A as denoted by SCAN in FIG. 12.

This embodiment of the invention thus enables capturing all scanned data for the two pixel length of the recording medium S that can be scanned before the media transportation motor 26 actually stops.

The CPU 40 therefore determines if the period from when the stop command is applied to the media transportation motor 26 to when the media transportation motor 26 actually stops conveying the recording medium S, that is, if the time required to convey the recording medium S this two pixel distance (=conveyance stop delay period WS1) has passed (step S74).

If the decision of step S74 is that the period from the stop command to when conveyance of the recording medium S by the media transportation motor 26 actually stops, that is, the time required to convey the recording medium S this two pixel distance (=conveyance stop delay period WS1) has not passed, a standby state is entered.

If the decision of step S74 is that the time required to convey the recording medium S this two pixel distance by means of the media transportation motor 26 has passed, scanning by means of the first scanner 111 and second scanner 112 is stopped.

More specifically, at time t4 when the estimated time from when stopping recording medium S transportation is commanded at time t3 to when conveyance of the recording medium S by the media transportation motor 26 actually stops, that is, when
the time required to convey the recording medium S two pixels has passed, first scanner 111 and second scanner 112 stop scanning, and the light sources (LEDs) of the scanning beams in the first scanner 111 and second scanner 112 turn off.

More specifically, top LED emit signal J and bottom LED emit signal O go low, and the state of top data acquisition signal K and the state of bottom data acquisition signal P are set to the state interrupting writing scanned data to the image buffer 41A (the state denoted SCAN WAIT in FIG. 13).

In addition, top scanning write enable signal H goes low to prohibit writing the scanned data output from the first scanner 111 to the image buffer 41A, and discard scan enable signal I goes high to permit discarding scanned data output from the first scanner 111. The scanning reference signal F is set to disable buffering data to the image buffer 41A (indicated in FIG. 13 by the CisInt state of the signal F corresponding to the scanning reference signal F going to the BUFFER WAIT state).

As a result, the first scanner 111 does not access the image buffer 41A.

The scanning write enable signal M also goes low to prohibit writing the scanned data output from the second scanner 112 to the image buffer 41A, and discard scan enable signal N goes high to permit discarding scanned data output from the second scanner 112. As a result, the second scanner 112 does not access the image buffer 41A.

During this process, the CPU 40 determines if there is a block for which scanning is completed (step S60). If there is a block for which scanning is completed (step S60 returns Yes), the CPU 40 starts the process of reading and sending the image data captured for that block from the image buffer 41A in RAM 41 to the host computer 200 (step S61), and then deletes the image data for that block from the image buffer 41A after data transmission is completed.

Therefore, if scanning by the first scanner 111 and second scanner 112 is stopped, the remaining capacity of the image buffer 41A gradually increases until it exceeds a preset resume buffering level (which is greater than the stop buffering level) that is set with a hysteresis characteristic relative to the stop buffering level.

As shown in FIG. 14, the CPU 40 thus determines if the remaining capacity of the image buffer 41A exceeds the preset resume buffering level (step S81).

If the decision of step S81 is that the remaining capacity of the image buffer 41A does not exceed the preset resume buffering level (step S81 returns No), the wait state is resumed.

If the decision of step S81 is that the remaining capacity of the image buffer 41A exceeds the preset resume buffering level (step S81 returns Yes), the CPU 40 asserts a command to resume transportation of the recording medium S the first time the drive reference timing of the media transportation motor 26 next matches the drive reference timing of the first scanner 111 and second scanner 112, and the media transportation motor 26, first scanner 111 and second scanner 112 are driven (step S82).

More specifically, at time t5 when the drive reference timing of the media transportation motor 26 matches the drive reference timing of the first scanner 111 and second scanner 112 for the first time after the resume buffering level is exceeded after time t4, a drive command is applied to the media transportation motor 26, first scanner 111 and second scanner 112 to resume conveying the recording medium S (corresponding to the period in FIG. 13 where the state of signal B corresponding to the initialization timing signal B of the media transportation motor 26 (the PFInt state) is denoted SCAN).

As a result, the first scanner 111 and second scanner 112 are driven, the light source (LEDs) for the scanning beam emit, and the recording medium S is scanned.

However, because the light source (LEDs) for the scanning beam is unstable at this time, and the first scanner 111 and second scanner 112 are therefore unstable, and there is a slight time lag (in this embodiment of the invention, the time needed to scan data from a two pixel wide area of the recording medium S) until the recording medium S is actually conveyed after driving the media transportation motor 26 starts, the CPU 40 determines if a time equal to a resume drive delay time WS2, which is the time required to scan this two pixel wide area, has passed since the drive commands of the media transportation motor 26, first scanner 111 and second scanner 112 were asserted in order to wait until the first scanner 111 and second scanner 112 stabilize and the recording medium S is actually conveyed (step S83).

During the period (time t5 to t6) equal to the resume drive delay time WS2, the state of signal B in FIG. 13 corresponding to the initialization timing signal B of the media transportation motor 26 (the state of PFInt) is set to SCAN to convey the recording medium S; the state (state of CisInt) of signal F corresponding to scanning reference signal F goes to CIS WAIT to wait for the first scanner 111 and second scanner 112 to stabilize; and the top data acquisition signal K and bottom data acquisition signal P go to the DATA DISPOSE state (FIG. 13) to prohibit writing the scanned data to image buffer 41A.

If the decision of step S83 is that the time equal to the resume drive delay time WS2, that is, the time required to read a two pixel wide area, has still not passed since the media transportation motor 26, first scanner 111 and second scanner 112 drive commands were asserted (step S83 returns No), storing the scanned data to the image buffer 41A is prohibited by discarding the scanned data (data discard mode is enabled) (step S84).

However, if the decision of step S83 is that the time needed to scan a two pixel wide area has passed since the media transportation motor 26, first scanner 111 and second scanner 112 drive signals were asserted (step S83 returns Yes), normal operation is resumed and buffering the scanned data to the image buffer 41A resumes (step S85).

More specifically, at time t6 when the first scanner 111 and second scanner 112 have stabilized and transportation of the recording medium S has actually started, the CPU 40 sets the scanning write enable signal H to high to enable writing the scanned data output from the first scanner 111 to the image buffer 41A; sets the discard scan enable signal I low to cancel discarding the scanned data output from the first scanner 111; sets the scanning write enable signal H high to enable writing the scanned data output from the second scanner 112 to the image buffer 41A; sets the discard scan enable signal I low to cancel discarding the scanned data output from the second scanner 112; and thus resumes normal operation from time t7 and resumes storing the scanned data in the image buffer 41A.

More specifically, at time t7, the state of signal B (PFInt state) in FIG. 13 corresponding to the initialization timing signal B of the media transportation motor 26 is set to SCAN; the state (CisInt state) of signal F corresponding to scanning reference signal F goes to CIS READ to capture the scanned data from the first scanner 111 and second scanner 112; and the top data acquisition signal K and bottom data acquisition signal P go to the SCAN state (FIG. 13) to pass the scanned data to image buffer 41A. Normal operation therefore resumes, and the scanned data is buffered to the image buffer 41A.

As a result, even if conveying the recording medium S stops and restarts, and storing the scanned data to the image buffer 41A stops and restarts, there is no shifting in the image that is based on the scanned image data before and after buffering stops and restarts, and high image quality can be maintained in the scanned image.

The CPU 40 then determines if scanning all blocks was completed (step S62). If the decision of step S62 is that there is a block for which scanning is not completed (step S62 returns No), the CPU 40 returns to step S59, continues scanning, and if a new block for which scanning is completed is detected, sends the image data for that block to the host computer 200.

If the decision of step S62 is that scanning all blocks in the scanning range R of both top and bottom sides is completed (step S62 returns Yes), the CPU 40 determines stops scanning.

As described above the photosensors of the first scanner 111 and second scanner 112 are offset with the first scanner 111 positioned approximately 5 mm in front in this embodiment of the invention. As a result, scanning the scanning range R on the top side is completed before the scanning range R on the bottom is completed when scanning in the forward direction, and when scanning in reverse scanning the scanning range R on the bottom is completed before scanning the scanning range R on the top is completed.

As described above, in a dot impact printer 10 according to this embodiment of the invention, the CPU 40 sends a stop transportation command to the motor driver 46 when the remaining capacity of the image buffer 41A goes below a stop buffering level; continues scanning by the first scanner 111 or second scanner 112 until a conveyance stop delay period WS1 passes from when this stop transportation command is asserted, and then stops scanning by the first scanner 111 or second scanner 112; applies a resume driving command to the media transportation motor 26, first scanner 111 and second scanner 112 when the remaining capacity exceeds a resume buffering level after conveyance stop delay period WS1 passes; prohibits storing scanned data captured by the first scanner 111 and second scanner 112 to the image buffer 41A until a resume drive delay time WS2 passes after the resume driving command is asserted; and after the resume drive delay time WS2 passes, resumes storing the scanned data output from the first scanner 111 and second scanner 112 to the image buffer 41A. As a result, a restart offset can be suppressed between the scanning position when media transportation stops and the scanning position when media transportation resumes, and the image quality of the captured scanning data (image data) can be improved.

A preferred embodiment of the invention is described above, but the invention is not limited thereto. For example, the resume buffering level is greater than the stop buffering level in the embodiment described above, but the resume buffering level may be greater than or equal to the stop buffering level.

In addition, both sides of the recording medium S are scanned at the same time in the foregoing embodiment, but the invention can also be applied when scanning only one side.

Furthermore, a configuration in which the alignment mechanism 28, recording head 18, and optical reader 110 are disposed in this order to the transportation path P of the recording medium S is described in the foregoing embodiment, but the invention is not so limited and the locations of these devices can be changed as desired. For example, the optical reader 110 could be disposed closest to the manual insertion opening 15.

In addition, the foregoing embodiment describes a control unit that is disposed to a control circuit board (not shown in the figure) installed in the dot impact printer 10, has the functions shown in the function blocks in FIG. 4, and controls other parts of the dot impact printer 10, but a device externally connected to the dot impact printer 10 could function as the function units shown in FIG. 4 and control operation of the dot impact printer 10. In addition, the function blocks shown in FIG. 4 are rendered by cooperation of hardware and software components, but the specific configuration of the hardware component and the specifications of the software component are not limited, and the detailed configurations thereof can be changed as desired.

Furthermore, the first scanner 111 and second scanner 112 in the foregoing embodiment are described as using RGB LEDs (light sources) to enable monochrome or color scanning, but a configuration using an infrared light source to enable infrared scanning is also conceivable. Furthermore, because magnetic ink has higher infrared absorbance than normal ink, infrared light can be used to read only the characters printed in magnetic ink, thereby enabling optically reading the MICR text in the MICR area MA efficiently.

The foregoing embodiment describes the invention applied to a flatbed scanner that conveys the recording medium S horizontally, but the invention is not so limited and can obviously be applied to a device with a transportation path that conveys recording media S such as checks and slips standing vertically on edge.

The foregoing embodiment also describes a dot impact printer 10 having an optical reader 110, but the invention is not so limited and can obviously be applied to other configurations having an optical reading unit comparable to the optical reader 110 disposed to an inkjet printer, thermal printer, or laser printer, for example. Yet further, the invention is not limited to devices that are used as a stand-alone printer, and configurations having an optical reading unit comparable to the optical reader 110 disposed in another device (such as an ATM (automated teller machine) or CD (cash dispenser)) are also conceivable.

Yet further, the invention is not limited to configurations rendering an optical reader 110 in unison with a device that records text or images on paper or other recording medium, and can obviously be applied to a wide range of other devices including stand-alone scanners and photocopiers.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical reading device comprising:
    a transportation unit that can convey a medium through a transportation path, the transportation unit including a media transportation motor;
    an optical reading unit that is disposed to the transportation path, optically reads the medium conveyed by the transportation unit, and captures and outputs scanned data;
    a storage unit that stores the scanned data output by the optical reading unit; and
    a control unit that controls the storage unit, transportation unit, and optical reading unit, wherein
        the control unit applies a stop command to stop driving the transportation unit when a drive reference timing of the media transportation motor and a scanning reference timing of the optical reading unit are synchronized, and until a specified time passes from application of the stop command, controls the optical reading unit to continue reading the medium, capturing scanned data and storing the scanned data captured during that time interval to the storage unit.

2. The optical reading device described in claim 1, wherein:

after the specified time passes from application of the stop command, the control unit applies a start command to start driving the transportation unit, and causes scanned data captured by the optical reading unit thereafter to be discarded, or prohibits storing the scanned data in the storage unit thereafter, until a specified time passes from application of the start command.

3. The optical reading device described in claim 2, wherein:

the amount of data captured by the optical reading unit and stored in the storage unit when the optical reading unit continues scanning until the specified time passes from application of the stop command, and the amount of data captured and discarded when the optical reading unit continues scanning until the specified time passes from application of the start command, are the same.

4. The optical reading device described in claim 2, wherein:

the control unit applies the stop command to the transportation unit when available capacity in the storage unit goes below a specified level, and applies the start command to the transportation unit when the available capacity in the storage unit exceeds a specified level.

5. A control method of an optical reading device comprising steps of:

conveying a medium through a transportation path using a transportation unit;

optically reading the medium conveyed by the transportation unit and outputting the scanned data using an optical reading unit;

storing the scanned data output by the optical reading unit in a storage unit;

applying a stop command, using a control unit, to stop driving the transportation unit;

continuing scanning by the optical reading unit and storing the scanned data to the storage unit until a specified time passes from application of the stop command; and applying a start command, using the control unit, after applying the stop command, to start driving the transportation unit; and discarding scanned data captured after application of the start command until a specified time passes from application of the start command.

6. The control method of an optical reading device described in claim 5, further comprising steps of:

applying the stop command from the control unit to the transportation unit when available capacity in the storage unit goes below a specified level; and applying the start command from the control unit to the transportation unit when the available capacity in the storage unit exceeds a specified level.

7. A computer-readable data storage medium carrying a computer program capable of implementing the method as described in claim 5.

* * * * *